(12) United States Patent
Iwasaki

(10) Patent No.: US 9,942,458 B2
(45) Date of Patent: Apr. 10, 2018

(54) IMAGE PICKUP APPARATUS, CONTROL APPARATUS, AND CONTROL METHOD FOR DISTRIBUTING CAPTURED IMAGES TO A TERMINAL VIA A NETWORK

(71) Applicant: CANON KABUSHIKI KAISHA, Tokyo (JP)

(72) Inventor: Takahiro Iwasaki, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/371,040

(22) Filed: Dec. 6, 2016

(65) Prior Publication Data

US 2017/0085778 A1 Mar. 23, 2017

Related U.S. Application Data

(63) Continuation of application No. 13/672,983, filed on Nov. 9, 2012, now Pat. No. 9,635,221.

(30) Foreign Application Priority Data

Nov. 14, 2011 (WO) .................. PCT/JP2011/076149

(51) Int. Cl.
*H04N 5/232* (2006.01)
*H04N 5/225* (2006.01)

(52) U.S. Cl.
CPC ......... *H04N 5/23206* (2013.01); *H04N 5/225* (2013.01); *H04N 5/232* (2013.01); *H04N 5/23216* (2013.01)

(58) Field of Classification Search
None
See application file for complete search history.

(56) References Cited

U.S. PATENT DOCUMENTS

2007/0109417 A1* 5/2007 Hyttfors ................. H04N 5/232
348/211.99

FOREIGN PATENT DOCUMENTS

| JP | 2000209575 A | 7/2000 |
|----|--------------|--------|
| JP | 2008153842 A | 7/2008 |
| JP | 2008205796 A | 9/2008 |
| JP | 2011061583 A | 3/2011 |

* cited by examiner

*Primary Examiner* — Stephen Coleman
(74) *Attorney, Agent, or Firm* — Canon U.S.A., Inc. IP Division

(57) ABSTRACT

An image pickup apparatus according to the present invention includes image pickup means; holding means for holding a coordinate system used to represent an image capturing direction of the image pickup means or a region in an image capturing range of the image pickup means; reception means for receiving a first command for rotating a captured image obtained by the image pickup means or a captured image cut out from the region in the image capturing range by a certain angle, a second command for rotating the coordinate system held in the holding means about the origin by the certain angle, and specification information for specifying the image capturing direction in the coordinate system; and change control means for executing control to change the image capturing direction of the image pickup means to the image capturing direction specified by the specification information.

25 Claims, 14 Drawing Sheets

FIG. 5A

IMAGE CAPTURING RANGE CHANGING COMMAND

| DESTINATION ADDRESS | SOURCE ADDRESS | IMAGE CAPTURING RANGE CHANGING COMMAND | PANNING COORDINATE (-1.0 TO +1.0) | TILTING COORDINATE (-1.0 TO +1.0) | ZOOMING COORDINATE (0.0 TO +1.0) |
|---|---|---|---|---|---|

FIG. 5B

IMAGE ORIENTATION CHANGING COMMAND

| DESTINATION ADDRESS | SOURCE ADDRESS | IMAGE ORIENTATION CHANGING COMMAND | IMAGE ORIENTATION (OFF = NORMAL /ON = INVERTED) |
|---|---|---|---|

FIG. 5C

COORDINATE ORIENTATION CHANGING COMMAND

| DESTINATION ADDRESS | SOURCE ADDRESS | COORDINATE ORIENTATION CHANGING COMMAND | COORDINATE ORIENTATION (OFF = NORMAL/ON = INVERTED) |
|---|---|---|---|

FIG. 5D

IMAGE COORDINATE ORIENTATION CHANGING COMMAND

| DESTINATION ADDRESS | SOURCE ADDRESS | IMAGE COORDINATE ORIENTATION CHANGING COMMAND | IMAGE/COORDINATE ORIENTATIONS (OFF = NORMAL/ON = INVERTED) |
|---|---|---|---|

FIG. 5E

NORMAL RESPONSE

| DESTINATION ADDRESS | SOURCE ADDRESS | NORMAL RESPONSE |
|---|---|---|

FIG. 5F

ERROR RESPONSE

| DESTINATION ADDRESS | SOURCE ADDRESS | ERROR RESPONSE |
|---|---|---|

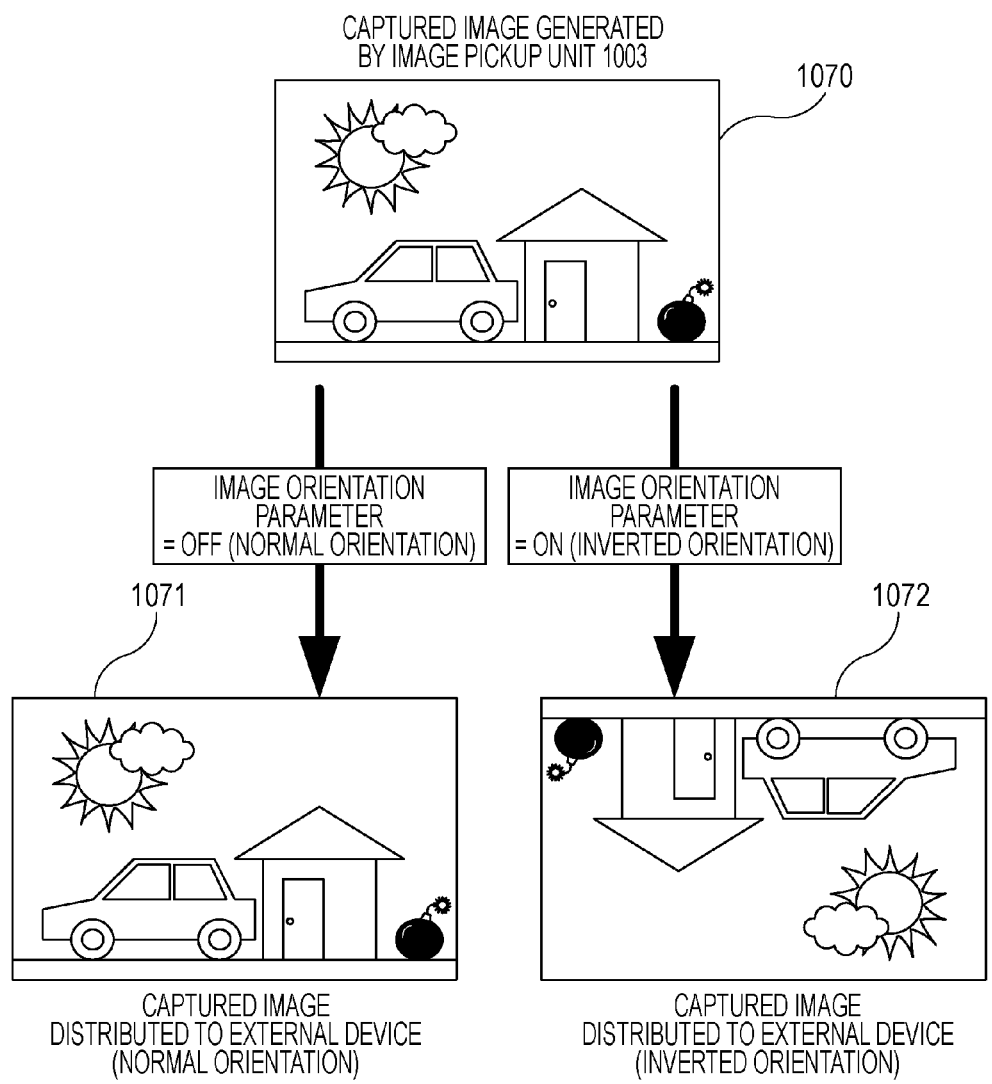

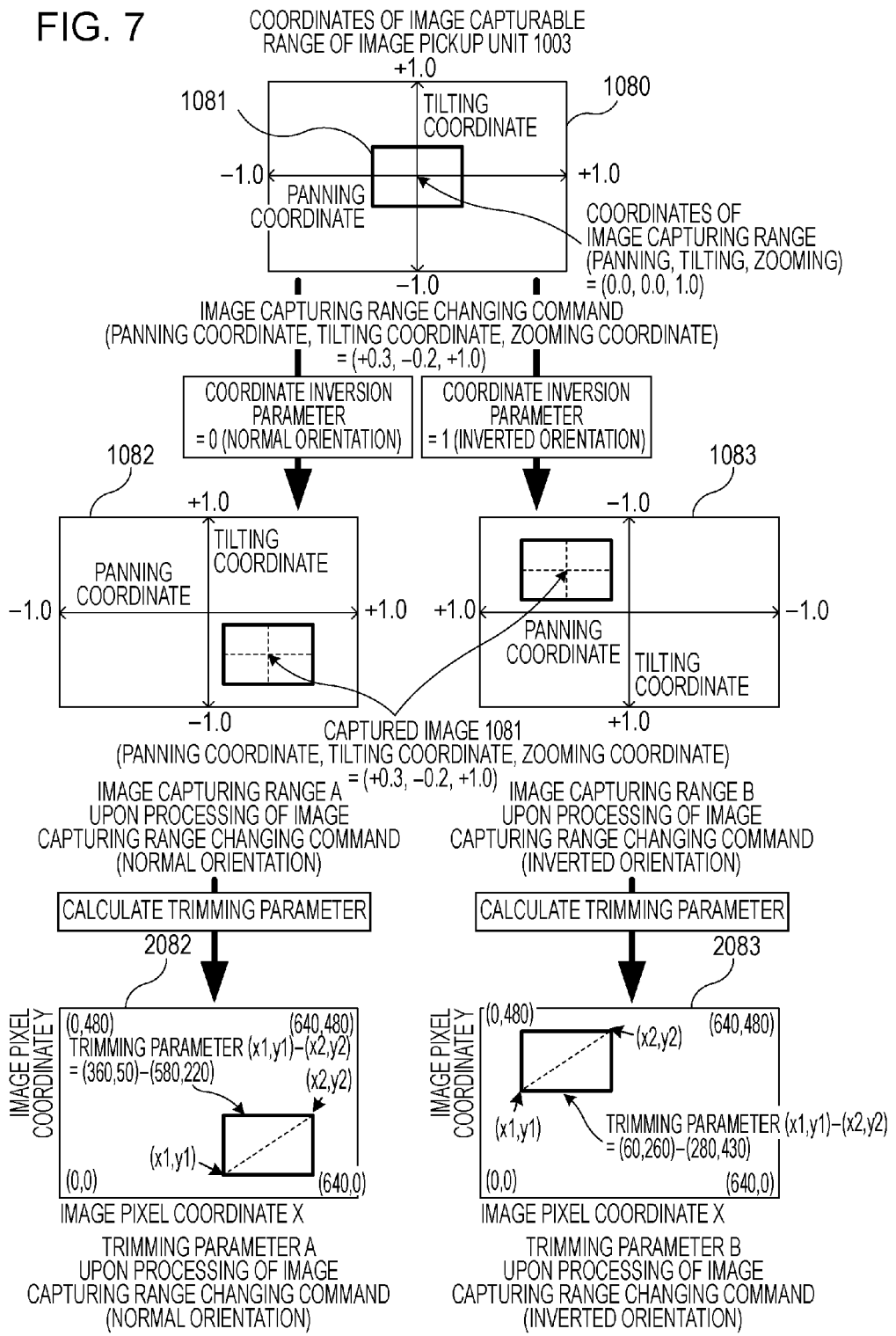

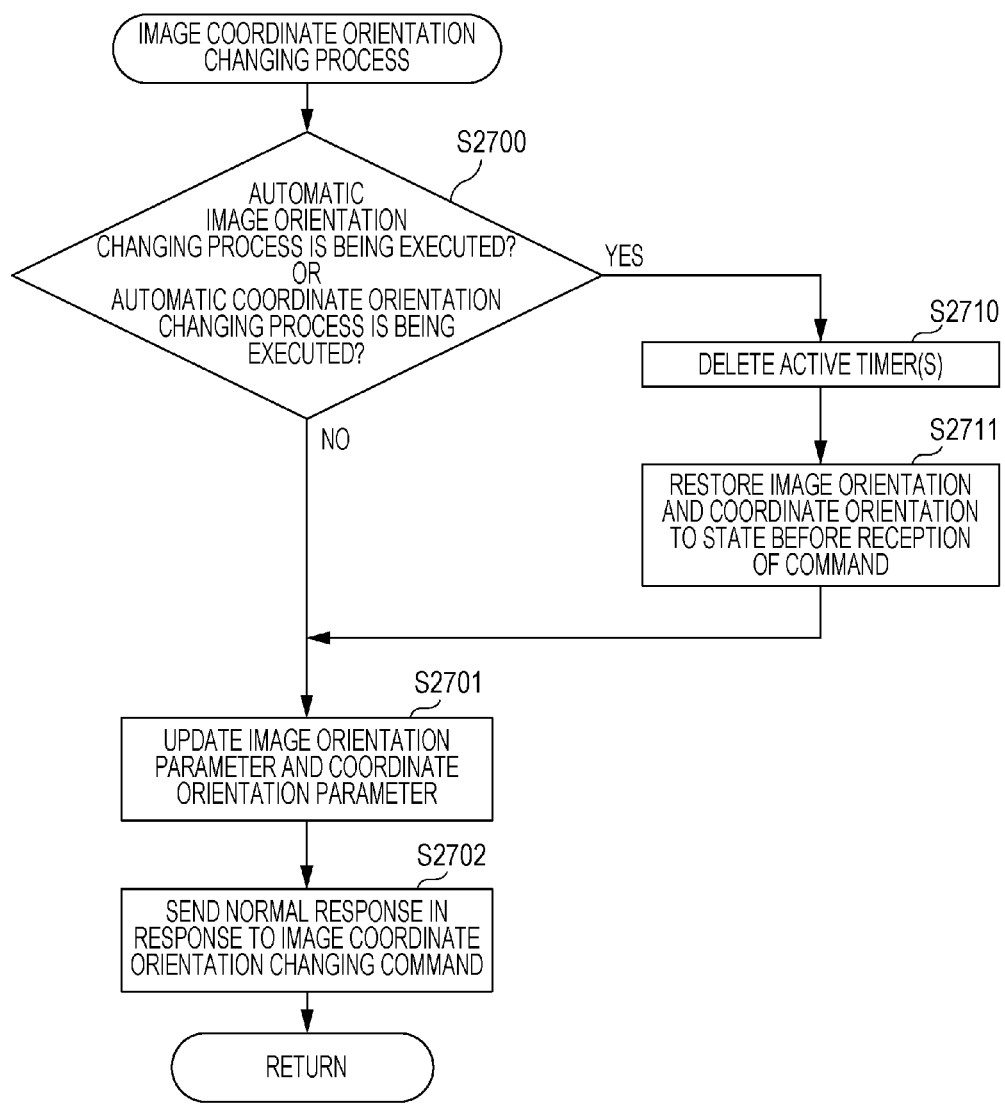

IMAGE PICKUP APPARATUS, CONTROL APPARATUS, AND CONTROL METHOD FOR DISTRIBUTING CAPTURED IMAGES TO A TERMINAL VIA A NETWORK

The present application is a continuation of U.S. patent application Ser. No. 13/672,983, filed Nov. 9, 2012, entitled "IMAGE CAPTURING APPARATUS, CONTROL APPARATUS, AND CONTROL METHOD FOR DISTRIBUTING CAPTURED IMAGES TO A TERMINAL VIA A NETWORK" the content of which is expressly incorporated by reference herein in its entirety. Further, the present application claims priority from International Patent Application No. PCT/JP2011/076149, filed Nov. 14, 2011, which is hereby incorporated by reference herein in its entirety.

TECHNICAL FIELD

The present invention relates to an image pickup apparatus capable of distributing a captured image to a terminal via a network, and more particularly relates to exclusion processing of plural interfaces provided by the image pickup apparatus to the terminal.

BACKGROUND ART

An image pickup apparatus that changes an image capturing direction by activating a pan head has been known. In addition, an image pickup apparatus that changes a direction in which the image pickup apparatus captures an image, in response to an instruction sent from a control apparatus connected to the image pickup apparatus via a network has been known. In these image pickup apparatuses, when the setup state of each image pickup apparatus is changed, the direction in which the image pickup apparatus captures an image in response to the same command is different before and after the change.

For example, the case in which the setup state of an image pickup apparatus is changed from a state in which the image pickup apparatus is set to be upright to a state in which the image pickup apparatus is set to be flat and placed on a ceiling or the like will be described. When a command for causing the image capturing direction of an image pickup apparatus that has been set to be upright to be directed upward is given to an image pickup apparatus that has been set to be flat, the image pickup apparatus operates so that the image capturing direction is directed downward. When the setup state of the image pickup apparatus is changed from being upright to being flat, the direction in which the image pickup apparatus captures an image in response to the same command is inverted between top and bottom and between left and right.

To this end, an image pickup system that has plural control programs for changing the direction in which an image pickup apparatus captures an image and that switches a control program to use in accordance with the setup orientation of the image pickup apparatus is known (for example, see Patent Literature). In the image pickup system, the coordinate system for representing the image capturing direction in terms of coordinates is switched by switching the control program. Accordingly, regardless of the setup state, the image capturing direction of the image pickup apparatus can always be directed to a certain direction in response to a particular command.

CITATION LIST

Patent Literature

Japanese Patent Laid-Open No. 2008-153842

When a control apparatus is to receive and display a captured image obtained by an image pickup apparatus, a change in the setup state of the image pickup apparatus also affects the orientation of the captured image displayed by the control apparatus. Therefore, it is preferable that the orientation of the obtained captured image be also changeable. For example, when the setup state of the image pickup apparatus is changed from an upright state to a flat state, top/bottom and left/right of the captured image displayed at the control apparatus are inverted. To this end, a captured image obtained by the image pickup apparatus in a flat state is rotated by 180 degrees and is displayed at the control apparatus. Accordingly, the captured image whose top/bottom and left/right are identical to those of a captured image obtained in an upright state can be displayed.

An interface for changing the orientation of a captured image displayed at the control apparatus and an interface for changing the coordinate system for controlling the above-described image capturing direction may be defined as different commands. In such an image pickup apparatus, when both of the orientation of a captured image to be displayed and the orientation of the coordinate system for controlling the image capturing direction are to be changed, the top/bottom and left/right orientation of a captured image to be displayed may not be identical to the top/bottom and left/right orientation of the coordinate system. For example, regarding a command for changing the orientation of the captured image and a command for changing the orientation of the coordinate system, when one of the commands received prior to the other is processed and the other command is unprocessed, the orientation of the captured image is not identical to the orientation of the coordinate system.

In this state, when a user looks at a distributed captured image and sends a command for changing the image capturing direction to the image pickup apparatus, there is a problem that the pan head is activated in a direction different from that expected by the user. The same or similar problem is not limited to the case in which the orientation of the captured image or the coordinate system is rotated by 180 degrees. The same or similar problem occurs in the case where the orientation of the captured image or the orientation of the coordinate system is rotated by arbitrary degrees.

SUMMARY OF INVENTION

To solve the above-described problem, an image pickup apparatus according to the present invention has, for example, the following configuration. That is, the image pickup apparatus includes image pickup means; holding means for holding a coordinate system used to represent an image capturing direction of the image pickup means; reception means for receiving a first command for rotating a captured image obtained by the image pickup means by a certain angle, a second command for rotating the coordinate system held in the holding means about the origin by the certain angle, and specification information for specifying the image capturing direction in the coordinate system; change control means for executing control to change the image capturing direction of the image pickup means to the image capturing direction specified by the specification information; and control means for executing, when the reception means receives one of the first command and the second command, control to execute the first command and the second command.

Also, an image pickup apparatus according to the present invention has, for example, the following configuration. That is, the image pickup apparatus includes image pickup means; holding means for holding a coordinate system used to represent a region in an image capturing range of the image pickup means; reception means for receiving a first command for rotating a captured image cut out from the region in the image capturing range by a certain angle, a second command for rotating the coordinate system held in the holding means about the origin by the certain angle, and specification information for specifying, in the coordinate system, a region for cutting out the captured image from the image capturing range; cut-out means for cutting out the captured image in the region in the coordinate system, the region being specified by the specification means; and control means for executing, when the reception means receives one of the first command and the second command, control to execute the first command and the second command.

Also, a control apparatus according to the present invention has, for example, the following configuration. That is, the control apparatus is a control apparatus for controlling an image pickup apparatus including holding means for holding a coordinate system used to represent an image capturing direction of image pickup means. The control apparatus includes specification means for specifying an image capturing direction in the coordinate system; sending control means for executing control to send, to the image pickup apparatus, a first command for rotating a captured image obtained by the image pickup means in the image capturing direction specified by the specification means by a certain angle, and a second command for rotating the coordinate system held in the holding means about the origin by the certain angle; and control means for executing, when the sending control means receives an instruction to send one of the first command and the second command to the image pickup apparatus, control to cause the image pickup apparatus to execute the first command and the second command.

Also, a control apparatus according to the present invention has, for example, the following configuration. That is, the control apparatus is a control apparatus for controlling an image pickup apparatus including holding means for holding a coordinate system used to represent a region in an image capturing range of image pickup means. The control apparatus includes specification means for specifying a region in the coordinate system; sending control means for executing control to send, to the image pickup apparatus, a first command for rotating a captured image in the region in the image capturing range in accordance with the region in the coordinate system, the region being specified by the specification means, by a certain angle, and a second command for rotating the coordinate system held in the holding means about the origin by the certain angle; and control means for executing, when the sending control means receives an instruction to send one of the first command and the second command to the image pickup apparatus, control to cause the image pickup apparatus to execute the first command and the second command.

Further features of the present invention will become apparent from the following description of exemplary embodiments with reference to the attached drawings.

BRIEF DESCRIPTION OF DRAWINGS

FIG. 5A is a diagram for describing a command received by the image pickup apparatus according to the present invention;

FIG. 5B is a diagram for describing a command received by the image pickup apparatus according to the present invention;

FIG. 5C is a diagram for describing a command received by the image pickup apparatus according to the present invention;

FIG. 5D is a diagram for describing a command received by the image pickup apparatus according to the present invention;

FIG. 5E is a diagram for describing a response received by the image pickup apparatus according to the present invention;

FIG. 5F is a diagram for describing a response received by the image pickup apparatus according to the present invention;

FIG. 6 is a diagram for describing inversion of the image orientation of a captured image;

FIG. 7 is a diagram for describing inversion of a coordinate system used by the image pickup apparatus;

FIG. 9C is a flowchart for describing the details of the operation of the image pickup apparatus according to the second embodiment;

DESCRIPTION OF EMBODIMENTS

Hereinafter, the present invention will be described in detail on the basis of preferred embodiments thereof. Note that the configuration discussed in the following embodiments is only exemplary, and the present invention is not limited to the illustrated configuration.

First Embodiment

Figure 1A:
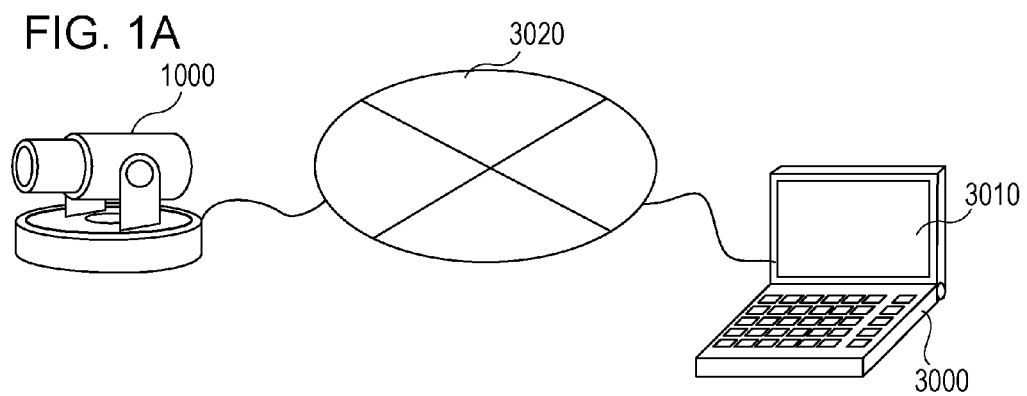
FIG. 1A is a diagram for describing the configuration of an image pickup system according to the present invention.

FIG. 1A illustrates the configuration of an image pickup system according to the present embodiment. In the image pickup system according to the present embodiment, an image pickup apparatus 1000 is connected to a client 3000 via a network 3020. The image pickup apparatus 1000 distributes a captured image obtained by the image pickup apparatus 1000 to the client 3000 via the network 3020.

The network 3020 includes plural routers, switches, and cables satisfying a communication standard such as Ethernet (registered trademark). In the present invention, any communication standard, size, and configuration may be used as long as communication can be performed between the image pickup apparatus 1000 and the client 3000. For example, the network 3020 may include the Internet, a wired LAN (Local Area Network), a wireless LAN, or a WAN (Wide Area Network).

The client 3000 sends a command to the image pickup apparatus 1000. The client 3000 sends a command for changing the image capturing direction or the angle of view of the image pickup apparatus 1000. Also, the client 3000 sends a command for rotating a coordinate system, which is used to represent a position in the image capturing range of the image pickup apparatus 1000, about the origin. Further, the client 3000 includes a display unit 3010 for displaying a captured image obtained by the image pickup apparatus 1000. The client 3000 sends a command for rotating, at the image pickup apparatus 1000, the captured image displayed on the display unit 3010.

Figure 1B:
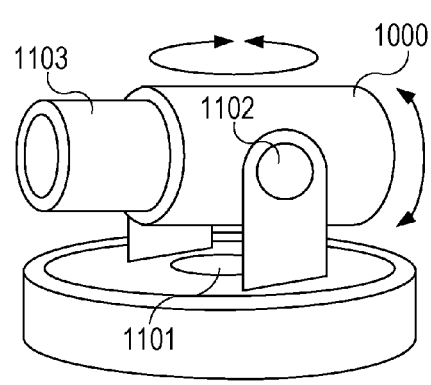
FIG. 1B is a diagram for describing the configuration of the image pickup apparatus according to the present invention.

The image pickup apparatus 1000 changes the image capturing direction in response to the command, received from the client 3000, for changing the image capturing direction. Also, the image pickup apparatus 1000 changes the angle of view in response to the command, received from the client 3000, for changing the angle of view. Using FIG. 1B, drive mechanisms for causing the image pickup apparatus 1000 according to the present embodiment to change the image capturing direction or the angle of view will be described. A panning drive mechanism 1101 changes the image capturing direction of the image pickup apparatus 1000 in a panning direction. In addition, a tilting drive mechanism 1102 changes the image capturing direction of the image pickup apparatus 1000 in a tilting direction. Further, a zooming mechanism 1103 changes the angle of view of the image pickup apparatus 1000.

Figure 2A:
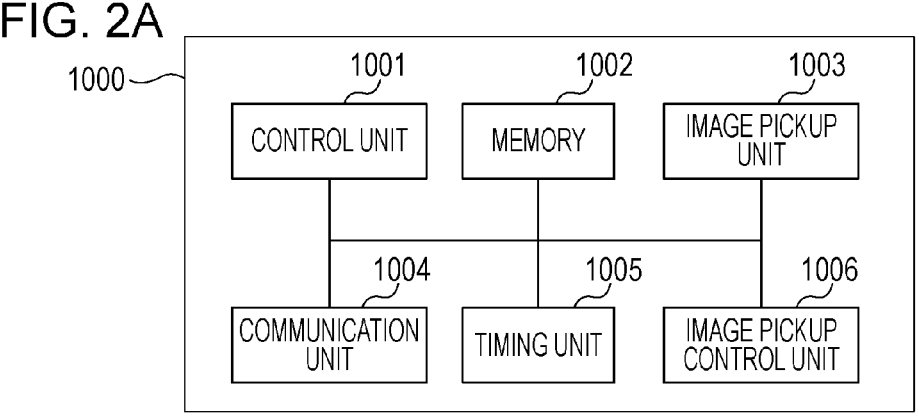
FIG. 2A is a diagram for describing the configuration of an image pickup apparatus according to the present invention.

FIG. 2A illustrates the internal configuration of the image pickup apparatus 1000 according to the present embodiment. In FIG. 2A, a control unit 1001 executes the overall control of the image pickup apparatus 1000. The control unit 1001 includes, for example, a CPU (Central Processing Unit), and executes a program stored in a memory 1002 described later. Alternatively, the control unit 1001 may execute control using hardware.

The memory 1002 is used as a data storage region, such as a storage region of a program executed by the control unit 1001, a work region for a program being executed, or a storage region of a captured image generated by an image pickup unit 1003 described later. In addition, the memory 1002 holds the coordinate system used to represent the image capturing direction of the image pickup unit 1003 described later. Also, when the control unit 1001 is executing a particular command (an automatic image orientation changing command or an automatic coordinate orientation changing command) described later, the memory 1002 holds information for indicating that these commands are being executed. For example, when a particular command is being executed, a flag managed in the memory 1002 is set, thereby indicating that the particular command is being executed.

The image pickup unit 1003 captures an image of a subject and converts the obtained analog signal into digital data. Also, the image pickup unit 1003 executes data compression processing by performing, for example, ADCT (Adaptive Discrete Cosine Transform) to generate a captured image, and outputs the captured image to the memory 1002. After outputting the captured image to the memory 1002, the image pickup unit 1003 sends an image obtaining event to the control unit 1001.

A communication unit 1004 receives, from the client 3000, an image capturing range changing command illustrated in FIG. 5A, an image orientation changing command illustrated in FIG. 5B, and a coordinate orientation changing command illustrated in FIG. 5C. Upon receipt of the commands illustrated in FIGS. 5A to 5C, the communication unit 1004 sends reception events to the control unit 1001. Also, the communication unit 1004 sends responses in response to the commands illustrated in FIGS. 5A to 5C to the client. In the present embodiment, the communication unit 1004 sends a normal response, which is a response for indicating that the received command is normally executed, or an error response, which is a response for indicating that the received command is not executed, to the client. FIG. 5E illustrates an example of the normal response. In addition, FIG. 5F illustrates an example of the error response.

A timing unit 1005 measures a time period that has elapsed since the image pickup apparatus 1000 has received the image orientation changing command or the coordinate orientation changing command. When a certain time period has elapsed after the start of execution of a particular command (an automatic image orientation changing command or an automatic coordinate orientation changing command) described later, the timing unit 1005 sends a timeout event to the control unit 1001.

An image pickup control unit 1006 controls the panning drive mechanism 1101, the tilting drive mechanism 1102, and the zooming mechanism 1103 in accordance with instructions from the control unit 1001. That is, when the communication unit 1004 receives the image capturing range changing command, described later using FIG. 5A, from the client 3000, a reception event in response to the command is sent to the control unit 1001. When the control unit 1001 receives the reception event, the control unit 1001 gives a control instruction to the image pickup control unit 1006 in accordance with the contents of the reception event. Having received the control instruction, the image pickup control unit 1006 executes control to drive the panning drive mechanism 1101, the tilting drive mechanism 1102, or the zooming mechanism 1103 in accordance with the control instruction. The image pickup control unit 1006 executes change control to change the image capturing direction, in which the image pickup unit 1003 captures an image, to a position specified by the coordinates specified by the image capturing range changing command, described later using FIG. 5A, and the above-described coordinate system held in the memory 1002. In this manner, the image pickup control unit 1006 executes control to change the image capturing direction of the image pickup unit 1003 to an image capturing direction specified by specification information.

The internal configuration of the image pickup apparatus 1000 has been described above. Processing blocks illustrated in FIG. 2A describe an example of a preferred embodiment of the image pickup apparatus 1000 according to the present invention and are not limited thereto. Without departing from the scope of the gist of the present invention, various modifications and changes can be made, such as including an audio input unit.

Figure 2B:
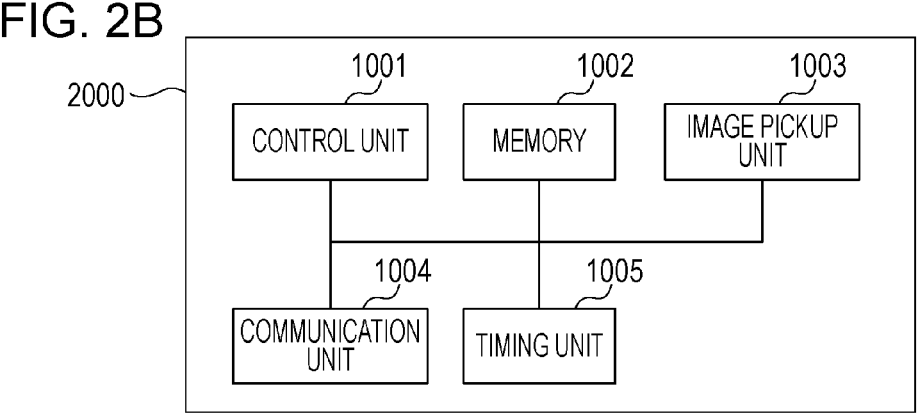
FIG. 2B is diagram for describing the configuration of an image pickup apparatus according to the present invention.
Figure 2C:
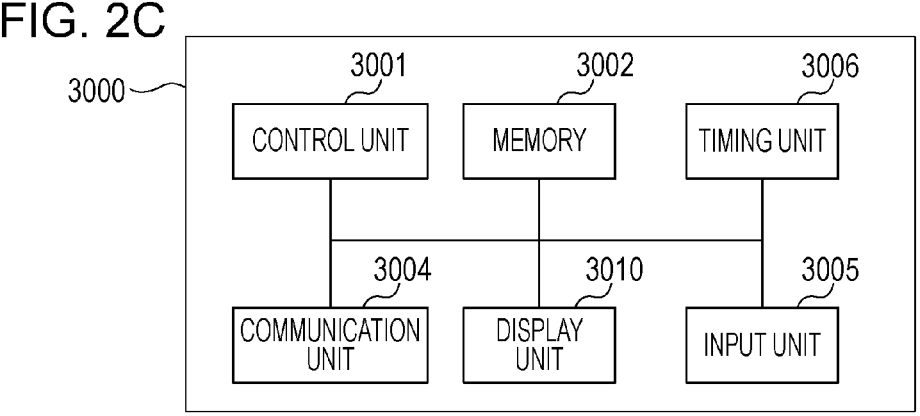
FIG. 2C is diagram for describing the configuration of a client according to the present invention.

Next, the internal configuration of the client 3000 will be described using FIG. 2C. The client 3000 is configured as a computer device connected to the network 3020. A control unit 3001 executes the overall control of the client 3000. The control unit 3001 includes, for example, a CPU, and executes a program stored in a memory 3002 described later. Alternatively, the control unit 3001 may execute control using hardware.

The memory 3002 is used as a storage region of a program executed by the control unit 3001, a work region for a program being executed, and a data storage region.

A communication unit 3004 receives a captured image sent from the image pickup apparatus 1000. In addition, the communication unit 3004 sends commands for controlling the image pickup apparatus 1000.

An input unit 3005 accepts input of an instruction from a user. For example, the input unit 3005 can accept, as an instruction from the user, input of an instruction to send various commands to the image pickup apparatus 1000. The details of commands for the image pickup apparatus 1000 will be described later using FIGS. 5A to 5C. When an instruction to send a command to the image pickup apparatus 1000 is input from the user, the input unit 3005 notifies the control unit 3001 of the fact that the instruction to send a command has been input. In response to the instruction input to the input unit 3005, the control unit 3001 generates a command for the image pickup apparatus 1000, and executes sending control to send the generated command to the image pickup apparatus 1000 via the communication unit 3004.

In addition, the input unit 3005 can accept input of the user's response in response to, for example, a query message for the user, which is generated by the control unit 3001 executing the program stored in the memory 3002.

A timing unit 3006 measures a time period that has elapsed since the image orientation changing command or the coordinate orientation changing command has been sent to the image pickup apparatus 1000.

The display unit 3010 displays a captured image received by the communication unit 3004. Also, the display unit 3010 can display, for example, a query message for the user, which is generated by the control unit 3001 executing the program stored in the memory 3002.

Next, commands provided by the client 3000 to the image pick up apparatus 1000 will be described using FIGS. 5A to 5C. As illustrated in FIGS. 5A to 5C, each command includes information of a destination address indicating the destination of a target who executes the command, and information of a source address indicating the source of the command. Further, each command includes information for the contents and argument(s) of the command.

Firstly, an example of the image capturing range changing command will be described using FIG. 5A. Using the image capturing range changing command, the client 3000 changes the image capturing range of the image pickup apparatus 1000. Arguments of the image capturing range changing command include a panning coordinate, a tilting coordinate, and a zooming coordinate in the coordinate system held in the memory 1002. In the present embodiment, the client 3000 and the image pickup apparatus 1000 normalize the angle in a horizontal direction at which the image pickup apparatus 1000 can capture an image from −1.0 to +1.0. The panning direction of the image pickup apparatus 1000 is represented using a value from −1.0 to +1.0 as the panning coordinate. Similarly, the client 3000 and the image pickup apparatus 1000 normalize the angle in a vertical direction at which the image pickup apparatus 1000 can capture an image from −1.0 to +1.0. The tilting direction of the image pickup apparatus 1000 is represented using a value from −1.0 to +1.0 as the tilting coordinate.

Further in the present embodiment, the client 3000 and the image pickup apparatus 1000 normalize values in the range from the telephoto end to the wide angle end of zooming from −1.0 to +1.0. As a zooming value, for example, the value of zooming magnification or focal length can be used. The zooming position of the image pickup apparatus 1000 is represented using a value from −1.0 to +1.0 as the zooming coordinate. Using the present command, the client 3000 is capable of specifying the absolute position of the panning coordinate, the tilting coordinate, and the zooming coordinate, and arbitrarily changing the image capturing range of the image pickup apparatus 1000. The panning coordinate, the tilting coordinate, or the zooming coordinate held in the image capturing range changing command is specification information for specifying the image capturing direction in the coordinate system held in the memory 1002. The image capturing range changing command may not necessarily include all the pieces of specification information of the panning coordinate, the tilting coordinate, and the zooming coordinate. The image capturing range changing command may only need to include at least one piece of specification information.

Also, the specification information is not limited to that for specifying the absolute position of the panning coordinate, the tilting coordinate, or the zooming coordinate. The specification information may be information for representing a relative position of the image capturing direction after movement, with respect to the current image capturing direction, by using the coordinate system. For example, the specification information may be information of the direction of movement and the amount of movement from the current position in the coordinate system. Even in this way, the image capturing direction in the coordinate system can be specified. Accordingly, a user can give an instruction, such as "From the current position, move the image capturing direction by +0.5 in the panning direction", by using the client 3000.

Further, the specification information is not limited to the above-described case in which normalized values are used. For example, the panning coordinate or the tilting coordinate may be the angle of movement from a reference position (such as the panning end or the tilting end) in the movable range of the panning drive mechanism 1101 or the tilting drive mechanism 1102. Also, the value of zooming magnification or focal length may be used as the zooming coordinate.

Next, an example of the image orientation changing command will be described using FIG. 5B. Using the image orientation changing command, the client 3000 rotates the orientation of a captured image distributed by the image pickup apparatus 1000 by a certain angle (180 degrees in the present embodiment). The image pickup apparatus 1000 is capable of rotating the orientation of a captured image, with the point of intersection of diagonals of the captured image being the center of rotation. An argument of the image orientation changing command is an image orientation. In the present embodiment, OFF indicates a normal orientation, and ON indicates an inverted orientation. The normal orientation and the inverted orientation of a captured image will be described using FIG. 6.

In FIG. 6, a captured image 1070 is a captured image obtained by the image pickup unit 1003 of the image pickup apparatus 1000. A captured image 1071 indicates a captured image distributed to the client 3000 when OFF (normal orientation) is specified by the image orientation changing command illustrated in FIG. 5B. When OFF (normal orientation) is specified by the image orientation changing command, the image pickup apparatus 1000 sends the captured image 1071, whose image orientation is the same as that of the captured image 1070, to the client 3000. Also, a captured image 1072 indicates a captured image distributed to the client 3000 when ON (inverted orientation) is specified by the image orientation changing command illustrated in FIG. 5B. When ON (inverted orientation) is specified by the image orientation changing command, the image pickup apparatus 1000 in the present embodiment sends the captured image 1072, whose top/bottom and left/right are inverted from the captured image 1070, to the client 3000.

In this manner, when the image orientation changing command illustrated in FIG. 5B is received, the image pickup apparatus 1000 rotates a captured image being obtained by the image pickup unit 1003 by a certain angle (180-degree inversion in the present embodiment), and sends the rotated captured image to the client 3000.

Next, an example of the coordinate orientation changing command will be described using FIG. 5C. Using the coordinate orientation changing command, the client 3000 is capable of rotating the coordinate system, held in the memory 1002, about the origin by a certain angle (180 degrees in the present embodiment). Using the coordinate orientation changing command, the client 3000 is capable of rotating the orientation of the coordinate system by the same angle as that by which a captured image can be rotated in response to the above-described image orientation changing command. When the image pickup apparatus 1000 receives the coordinate orientation changing command, the image pickup apparatus 1000 rotates the orientation of the coordinate system by, for example, the origin of the coordinate system. An argument of the coordinate orientation changing command is a coordinate orientation. OFF indicates a normal orientation, and ON indicates an inverted orientation. The normal orientation and the inverted orientation of the coordinate orientation will be described using FIG. 7.

In FIG. 7, coordinates 1080 indicate the image capturable range of the image pickup unit 1003 of the image pickup apparatus 1000. At the coordinates 1080, as has been described above, the ranges of the panning coordinate and the tilting coordinate are normalized from −1.0 to +1.0. An image capturing range 1081 indicates the image capturing range of the image pickup unit 1003 at present in the image capturable range. At the coordinates 1080, the panning coordinate, the tilting coordinate, and the zooming coordinate are set to (0.0, 0.0, 1.0), respectively.

Coordinates 1082 and coordinates 1083 each indicate the case in which, in response to the image capturing range changing command illustrated in FIG. 5A, the panning coordinate, the tilting coordinate, and the zooming coordinate of the image capturing range 1081 are changed to (0.3, −0.2, 1.0), respectively.

The coordinates 1082 indicate the image capturing range in the case in which the normal coordinate orientation is selected as the argument of the coordinate orientation changing command illustrated in FIG. 5C. When the normal coordinate orientation is selected as the argument of the coordinate orientation changing command, the image pickup apparatus 1000 holds the coordinate system with the same orientation as that of the coordinates 1080.

In contrast, the coordinates 1083 indicate the image capturing range 1081 in the case in which the inverted coordinate orientation is selected as the argument of the coordinate orientation changing command illustrated in FIG. 5C. When the inverted coordinate orientation is selected as the argument of the coordinate orientation changing command, the image pickup apparatus 1000 rotates the coordinate system of the coordinates 1080 (180-degree inversion in the present embodiment).

With respect to the coordinates 1082, the coordinates 1083 are such that the coordinate system indicating the image capturable range has been rotated (180-degree inverted). Therefore, at the coordinates 1082 and the coordinates 1083, when the panning coordinate, the tilting coordinate, and the zooming coordinate of the image capturing range 1081 are changed to (0.3, −0.2, 1.0), the position of the image capturing range 1081 in which the image pickup apparatus 1000 captures an image in the image capturable range is different.

Next, the operation of the image pickup apparatus 1000 according to the present embodiment will be described using the flowcharts illustrated in FIG. 3 and FIGS. 4A to 4D. In a configuration in which the control unit 1001 of the image pickup apparatus 1000 includes a processor, the processing flow illustrated in FIG. 3 and FIGS. 4A to 4D indicates a program for causing the control unit 1001 to execute procedures illustrated in FIG. 3 and FIGS. 4A to 4D. The processor included in the control unit 1001 of the image pickup apparatus 1000 is a computer, and the processor executes a program read from the built-in memory 1002 included in the image pickup apparatus 1000.

Figure 3:
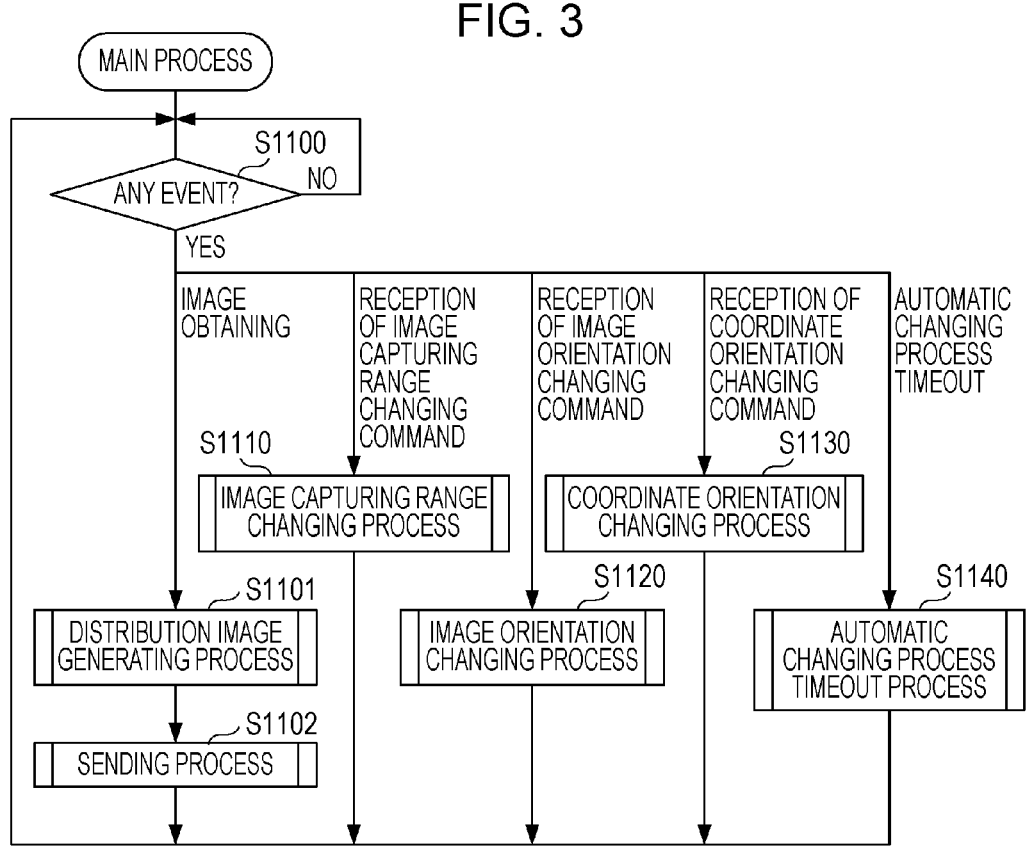
FIG. 3 is a flowchart for describing the operation of an image pickup apparatus according to a first embodiment.

A main process executed by the image pickup apparatus 1000 will be described using FIG. 3. At first, the control unit 1001 waits for an event (S1100). In the present embodiment, the image pickup apparatus 1000 determines that there is an event when an event of image obtaining, reception of the image capturing range changing command, reception of the image orientation changing command, reception of the coordinate orientation changing command, or automatic command timeout occurs.

When an image obtaining event occurs, the image pickup apparatus 1000 executes processing in steps S1101 to S1102. Here, an image obtaining event is an event that occurs when the image pickup apparatus 1000 receives, from the client 3000, an image obtaining request for obtaining a captured image obtained by the image pickup apparatus 1000.

When an image obtaining event occurs, the control unit 1001 of the image pickup apparatus 1000 executes a distribution image generating process (S1101). The details of the distribution image generating process will be described later using FIG. 4A.

When the distribution image generating process is completed, the control unit 1001 executes a sending process (S1102). In the sending process, the control unit 1001 sends a distribution image generated in the distribution image generating process in step S1101 via the communication unit 1004 to the client 3000 requesting video distribution from the image pickup apparatus 1000. After executing the sending process, the control unit 1001 returns to step S1100 and executes processing.

Alternatively, when the control unit 1001 of the image pickup apparatus 1000 receives, from the client 3000, the image capturing range changing command illustrated in FIG. 5A, the control unit 1001 executes an image capturing range changing process described later using FIG. 4B (S1110).

Alternatively, when the control unit 1001 receives, from the client 3000, the image orientation changing command illustrated in FIG. 5B, the control unit 1001 executes an image orientation changing process described later using FIG. 4C (S1120).

Alternatively, when the control unit 1001 receives, from the client 3000, the coordinate orientation changing command illustrated in FIG. 5C, the control unit 1001 executes a coordinate orientation changing process described later using FIG. 4D (S1130).

Figure 4A:
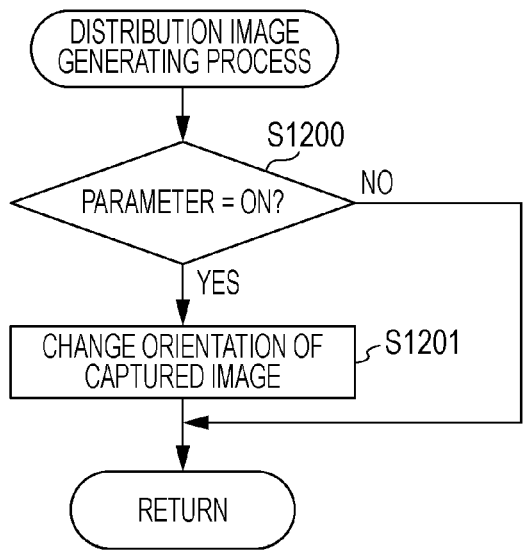
FIG. 4A is a flowchart for describing the details of the operation of the image pickup apparatus according to the first embodiment.
Figure 4B:
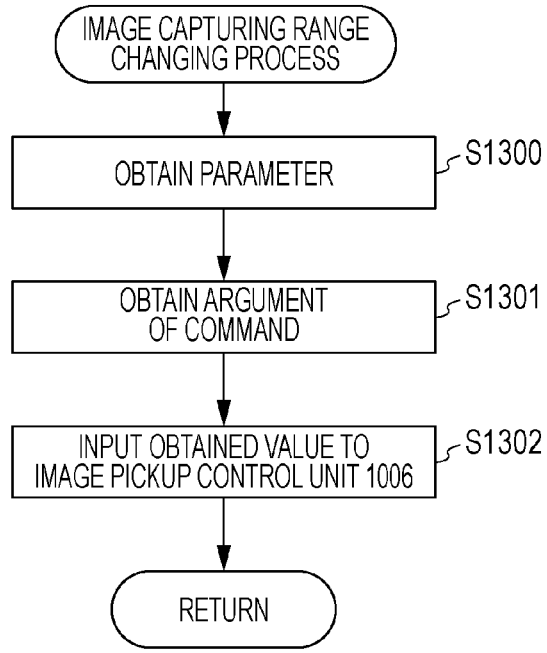
FIG. 4B is a flowchart for describing the details of the operation of the image pickup apparatus according to the first embodiment.
Figure 4C:
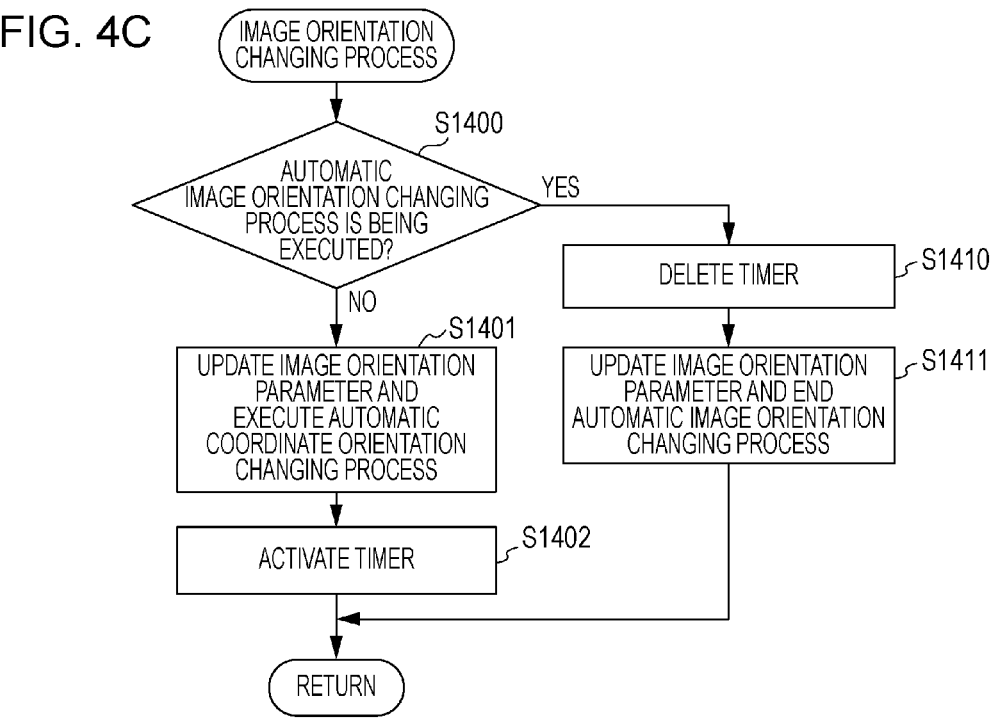
FIG. 4C is a flowchart for describing the details of the operation of the image pickup apparatus according to the first embodiment.
Figure 4D:
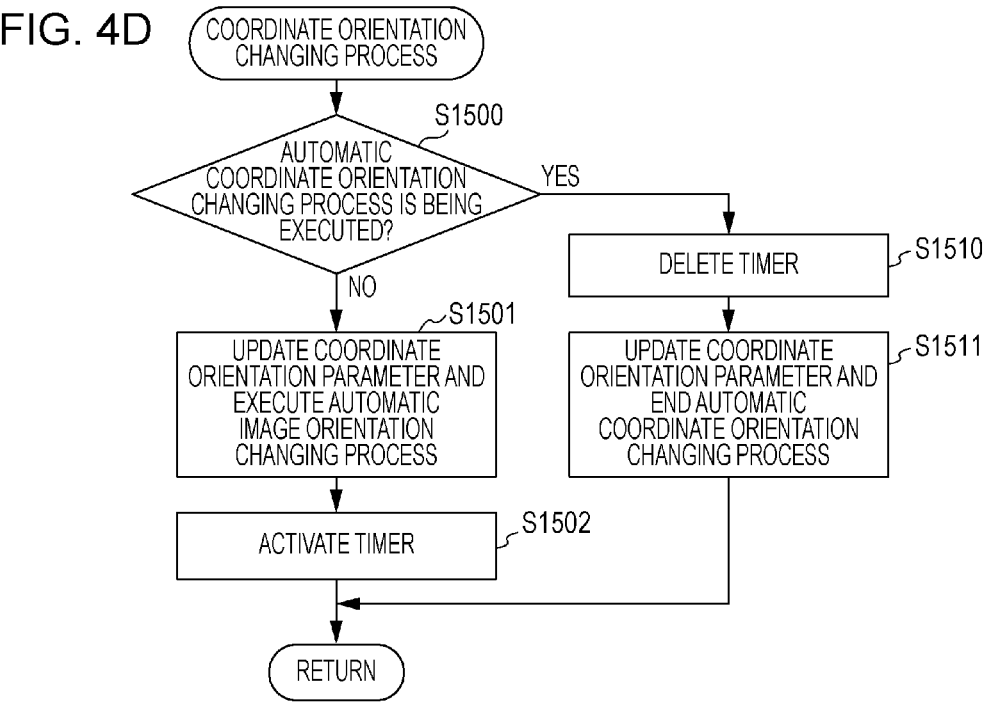
FIG. 4D is a flowchart for describing the details of the operation of the image pickup apparatus according to the first embodiment.

Alternatively, when a certain time period has elapsed since information indicating that an automatic image orientation changing process or an automatic coordinate orientation changing process described using FIG. 4C or FIG. 4D is being executed has been held in the memory 1002, the control unit 1001 executes an automatic changing process timeout process described later (S1140). Alternatively, the control unit 1001 may execute the automatic changing process timeout process described later when a certain time period has elapsed since reception of the image orientation changing command or the coordinate orientation changing command.

When the processing in step S1110, step S1120, step S1130, or step S1140 ends, the control unit 1001 returns to step S1100 and executes processing.

Next, the distribution image generating process in step S1101 will be described using FIG. 4A. The control unit 1001 refers to the memory 1002, and determines an image orientation parameter (S1200). When the image orientation parameter is ON (Yes in S1200), the control unit 1001 inverts (180-degree rotation) the captured image, as indicated by the captured image 1072 illustrated in FIG. 6, overwrites the captured image stored in the memory 1002, and ends the distribution image generating process (S1201). When the image orientation parameter is OFF (No in S1200), the control unit 1001 does not execute the processing, and ends the distribution image generating process.

Next, the image capturing range changing process in step S1110 will be described using FIG. 4B. The control unit 1001 refers to the memory 1002, and obtains a coordinate orientation parameter of the coordinate orientation changing command illustrated in FIG. 5C (S1300). Further, the control unit 1001 refers to the memory 1002, and obtains the arguments (panning coordinate, tilting coordinate, and zooming coordinate) of the image capturing range changing command illustrated in FIG. 5A (S1301).

The control unit 1001 inputs the obtained coordinate orientation parameter, and the panning coordinate, tilting coordinate, and zooming coordinate to the image pickup control unit 1006 (S1302). Accordingly, when the coordinate orientation parameter is ON (inverted orientation), the image pickup control unit 1006 inverts the coordinate system, as in the coordinates 1083 illustrated in FIG. 7, and operates the image capturing direction of the image pickup unit 1003. In contrast, when the coordinate orientation parameter is OFF (normal orientation), the image pickup control unit 1006 does not invert the coordinate system, as in the coordinates 1082 illustrated in FIG. 7, and operates the image capturing direction of the image pickup unit 1003. In the above manner, the control unit 1001 ends the image capturing range changing process.

Next, the image orientation changing process in step S1120 will be described using FIG. 4C. At first, the control unit 1001 refers to the memory 1002 and determines whether the automatic image orientation changing process is being executed (S1400). Here, the automatic image orientation changing process is a process in which the control unit 1001 automatically executes the image orientation changing command, regardless of the image orientation changing command received by the communication unit 1004. When the communication unit 1004 receives the coordinate orientation changing command, the automatic image orientation changing process is executed prior to reception of the image orientation changing command. The details of the automatic image orientation changing process will be described later using FIG. 4D.

When the automatic image orientation changing process is not being executed (No in S1400), the control unit 1001 reads the argument of the received image orientation changing command, and changes the image orientation parameter in the memory 1002. Further, the control unit 1001 executes the automatic coordinate orientation changing process (S1401).

Here, the automatic coordinate orientation changing process is a process in which the control unit 1001 automatically executes the coordinate orientation changing command, regardless of the coordinate orientation changing command received by the communication unit 1004. When the communication unit 1004 receives the image orientation changing command, the automatic coordinate orientation changing process is executed prior to reception of the coordinate orientation changing command.

In the automatic coordinate orientation changing process, the control unit 1001 executes a command for automatically rotating the orientation of the coordinate system by the same angle as that by which the captured image can be rotated in response to the image orientation changing command. That is, the control unit 1001 executes the received image orientation changing command, and automatically executes the coordinate orientation changing command in step S1401.

When the automatic coordinate orientation changing process is started in step S1401, the control unit 1001 holds, in the memory 1002, information indicating that the automatic coordinate orientation changing process is being executed. Information indicating that the automatic coordinate orientation changing process is being executed is such that, for example, setting an automatic coordinate orientation changing process flag indicates that the automatic coordinate orientation changing process is being executed, and unsetting the flag indicates that the process is not being executed. A method of holding the information indicating that the automatic coordinate orientation changing process is being executed is not limited to this. Any information can be used as long as the control unit 1001 is capable of determining whether the automatic coordinate orientation changing process is being executed.

When the automatic coordinate orientation changing process is started, the control unit 1001 uses the timing unit 1005 and activates a timer (S1402). The timer is a timer for continuing a state in which the coordinate orientation parameter has been changed by the automatic coordinate orientation changing process, for a certain time period after the start of the automatic coordinate orientation changing process. A timer value of the timer may be set in advance by a user, and may be about a few hundred milliseconds to about a few seconds. Upon activation of the timer, the control unit 1001 ends the image orientation changing process.

Alternatively, the timer may be activated at a point at which the communication unit 1004 receives the image orientation changing command, instead of at a point at which the automatic coordinate orientation changing process is started. In this way, a state in which the coordinate orientation parameter has been changed by the automatic coordinate orientation changing process can be continued for a certain time period after the reception of the command.

Accordingly, when the communication unit 1004 receives the image orientation changing command, the control unit 1001 executes control to execute the image orientation changing command and the coordinate orientation changing command prior to reception of the coordinate orientation changing command. The image orientation changing command is the command received by the communication unit 1004. Also, the coordinate orientation changing command is a command executed when the control unit 1001 executes the automatic coordinate orientation changing process.

Accordingly, the image pickup apparatus 1000 can output the captured image whose image orientation has been changed (captured image 1072 illustrated in FIG. 6), and change the image capturing range on the basis of the changed coordinates (coordinates 1083 illustrated in FIG. 7). Thus, the image pickup apparatus 1000 can output the captured image in a state in which the image orientation (normal orientation/inverted orientation) and the coordinate orientation (normal orientation/inverted orientation) match each other, and change the image capturing range. In this manner, the inconsistency between the coordinate orientation (normal orientation/inverted orientation) and the image orientation (normal orientation/inverted orientation) of the captured image, which is caused by changing only the image orientation (captured image 1072 illustrated in FIG. 6) while keeping the coordinate orientation unchanged (coordinates 1082 illustrated in FIG. 7), can be prevented.

In contrast, when the automatic image orientation changing process is being executed (Yes in S1400), the control unit 1001 deletes the timer (S1410). The timer is a timer activated in step S1502 described later. The timer is a timer for measuring how much time has elapsed in a certain time period for continuing a state in which the image orientation parameter has been changed by the automatic image orientation changing process.

After the timer is deleted, the control unit 1001 reads the argument of the received image orientation changing command, and changes the image orientation parameter in the memory 1002. Also, the control unit 1001 ends the automatic image orientation changing process (S1411). Here, ending the automatic image orientation changing process means rotating the orientation of the captured image so that the image orientation parameter, which has been changed by the automatic image orientation changing process, is restored to a state before execution of the automatic image orientation changing process.

That is, the control unit 1001 rotates the captured image by an angle commanded by the received image orientation changing command, from a state before execution of the automatic image orientation changing process, by executing processing in step S1411. When the processing in step S1411 is completed, the control unit 1001 ends the image orientation changing process.

As has been described above, the automatic image orientation changing process is a process executed after the communication unit 1004 receives the coordinate orientation changing command. That is, when the automatic image orientation changing process is being executed (Yes in S1400), the state is such that the communication unit 1004 has already received the coordinate orientation changing command, and the command is already being executed. In such a state, by executing processing in step S1411, the control unit 1001 can execute the image orientation changing command, received by the communication unit 1004, and the coordinate orientation changing command, received by the communication unit 1004.

When the control unit 1001 receives the image orientation changing command while the automatic image orientation changing process is being executed as above, the control unit 1001 ends the automatic image orientation changing process, and executes the image orientation changing command and the coordinate orientation changing command. Accordingly, the image pickup apparatus 1000 can output the captured image whose image orientation has been changed (captured image 1072 illustrated in FIG. 6), and change the image capturing range on the basis of the changed coordinates (coordinates 1083 illustrated in FIG. 7). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 1000 can execute the image orientation changing command while controlling the image capturing direction and the coordinate orientation to always match each other.

Next, the coordinate orientation changing process in step S1130 will be described using FIG. 4D.

At first, the control unit 1001 refers to the memory 1002, and determines whether the automatic coordinate orientation changing process is being executed (S1500). Here, the automatic coordinate orientation changing process is a process in which the control unit 1001 automatically executes the coordinate orientation changing command, regardless of the coordinate orientation changing command received by the communication unit 1004. When the communication unit 1004 receives the image orientation changing command, the automatic coordinate orientation changing process is executed prior to reception of the coordinate orientation changing command.

When the automatic coordinate orientation changing process is not being executed (No in S1500), the control unit 1001 reads the argument of the coordinate orientation changing command received by the communication unit 1004, and changes the coordinate orientation parameter in the memory 1002. Further, the control unit 1001 executes the above-described automatic image orientation changing process (S1501).

In the automatic image orientation changing process, the control unit 1001 executes a command for automatically rotating the orientation of the captured image by the same angle as that by which the coordinate system can be rotated in response to the coordinate orientation changing command. That is, the control unit 1001 executes the received coordinate orientation changing command, and automatically executes the image orientation changing command in step S1501.

When the automatic image orientation changing process is started in step S1501, the control unit 1001 holds, in the memory 1002, information indicating that the automatic image orientation changing process is being executed. Information indicating that the automatic image orientation changing process is being executed is such that, for example, setting an automatic image orientation changing process flag indicates that the automatic image orientation changing process is being executed, and unsetting the flag indicates that the process is not being executed. A method of holding the information indicating that the automatic image orientation changing process is being executed is not limited to this. Any information can be used as long as the control unit 1001 is capable of determining whether the automatic image changing process is being executed.

The control unit 1001 uses the timing unit 1005 and activates a timer (S1502). The timer is a timer for continuing a state in which the image orientation parameter has been changed by the automatic image orientation changing process, for a certain time period after the start of the automatic image orientation changing process. A timer value of the timer may be set in advance by a user, and may be about a few hundred milliseconds to about a few seconds. Upon activation of the timer, the control unit 1001 ends the coordinate orientation changing process.

Alternatively, the timer may be activated at a point at which the communication unit 1004 receives the coordinate orientation changing command, instead of at a point at which the automatic image orientation changing process is started. In this way, a state in which the image orientation parameter has been changed by the automatic image orientation changing process can be continued for a certain time period after the reception of the command.

Accordingly, when the communication unit 1004 receives the coordinate orientation changing command, the control unit 1001 executes control to execute the coordinate orientation changing command and the image orientation changing command prior to reception of the image orientation changing command. The coordinate orientation changing command is the command received by the communication unit 1004. Also, the image orientation changing command is a command executed when the control unit 1001 executes the automatic image orientation changing process.

Accordingly, the image pickup apparatus 1000 can output the captured image whose image orientation has been changed (captured image 1072 illustrated in FIG. 6), and change the image capturing range on the basis of the changed coordinates (coordinates 1083 illustrated in FIG. 7). Thus, the image pickup apparatus 1000 can output the captured image in a state in which the image orientation (normal orientation/inverted orientation) and the coordinate orientation (normal orientation/inverted orientation) match each other, and change the image capturing range. In this manner, the inconsistency between the image orientation (normal orientation/inverted orientation) of the captured image and the coordinate orientation (normal orientation/inverted orientation), which is caused by changing only the coordinate orientation (coordinates 1083 illustrated in FIG. 7) while keeping the image orientation unchanged (captured image 1071 illustrated in FIG. 6), can be prevented.

In contrast, when the automatic coordinate orientation changing process is being executed (Yes in S1500), the control unit 1001 deletes the timer (S1510). The timer is a timer activated in step S1402 in FIG. 4C described above. The timer is a timer for continuing a state in which the coordinate orientation parameter has been changed by the automatic coordinate orientation changing process.

The control unit 1001 reads the argument of the received coordinate orientation changing command, and changes the coordinate orientation parameter in the memory 1002. Also, the control unit 1001 ends the automatic coordinate orientation changing process (S1511). Here, ending the automatic coordinate orientation changing process means rotating the orientation of the coordinate system so that the coordinate orientation parameter, which has been changed by the automatic coordinate orientation changing process, is restored to a state before the execution of the automatic coordinate orientation changing process.

That is, the control unit 1001 rotates the coordinates by an angle commanded by the received coordinate orientation changing command, from a state before the execution of the automatic coordinate orientation changing process, by executing processing in step S1511. When the processing in step S1511 is completed, the control unit 1001 ends the coordinate orientation changing process.

As has been described above, the automatic coordinate orientation changing process is a process executed after the communication unit 1004 receives the image orientation changing command. That is, when the automatic coordinate orientation changing process is being executed (Yes in S1500), the state is such that the communication unit 1004 has already received the image orientation changing command, and the command is already being executed. In such a state, by executing processing in step S1511, the control unit 1001 can execute the coordinate orientation changing command, received by the communication unit 1004, and the image orientation changing command, received by the communication unit 1004.

When the control unit 1001 receives the coordinate orientation changing command while the automatic coordinate orientation changing process is being executed as above, the control unit 1001 ends the automatic coordinate orientation changing process, and executes the coordinate orientation changing command and the image orientation changing command. Accordingly, the image pickup apparatus 1000 can output the captured image whose image orientation has been changed (captured image 1072 illustrated in FIG. 6), and change the image capturing range on the basis of the changed coordinates (coordinates 1083 illustrated in FIG. 7). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 1000 can execute the coordinate orientation changing command while controlling the image capturing direction and the coordinate orientation to always match each other.

Next, the automatic changing process timeout process in step S1140 in FIG. 3 will be described. The automatic changing process timeout process is a process executed when a certain time period has elapsed since the execution of one of the automatic coordinate orientation changing process and the automatic image orientation changing process. Whether the certain time period has elapsed is determined using the timer activated in step S1402 in FIG. 4C or in step S1502 in FIG. 4D.

Alternatively, the automatic changing process timeout process may be executed when a certain time period has elapsed since the reception of one of the coordinate orientation changing command and the image orientation changing command. In this case, the timer may start counting at a point at which the coordinate orientation changing command or the image orientation changing command is received.

In the automatic changing process timeout process, the control unit 1001 ends the automatic coordinate orientation changing process or the automatic image orientation changing process. The control unit 1001 deletes the information in the memory 1002, which indicates that the automatic coordinate orientation changing process or the automatic image orientation changing process is being executed.

Further, in the automatic changing process timeout process, the control unit 1001 ends the execution of the image orientation changing command or the coordinate orientation changing command received by the communication unit 1004.

Even after the certain time period has elapsed since the reception of one of the image orientation changing command and the coordinate orientation changing command, if the other command is not received, the control unit 1001 rotates the image orientation or the coordinate orientation to be restored to a state before the reception of the received command (state before the execution of the image orientation changing command and the coordinate orientation changing command). Thus, because execution of only one of the image orientation changing command and the coordinate orientation changing command does not occur, the inconsistency between the orientation (normal orientation/inverted orientation) of the coordinate system of the image pickup apparatus 1000 and the image orientation (normal orientation/inverted orientation) of the captured image can be prevented.

In this manner, the image pickup apparatus 1000 can execute the coordinate orientation changing command while controlling the image capturing direction and the coordinate orientation to always match each other.

The image pickup apparatus 1000 according to the present embodiment can prevent a state in which only one of the image orientation and the coordinate orientation is changed. Accordingly, when the user changes the image capturing range while looking at the captured image distributed from the image pickup apparatus 1000, the orientation of the distributed captured image and the orientation in a command for changing the image capturing range are controlled to match each other. Thus, changes in the image capturing range in accordance with the user's intention can be realized.

Also in the automatic changing process timeout process, even after the certain time period has elapsed since the execution of one of the automatic image orientation changing command and the automatic coordinate orientation changing command, if the other command is not received, the control unit 1001 may end the automatic coordinate orientation changing command or the automatic image orientation changing command. Alternatively, in the automatic changing process timeout process, even after the certain time period has elapsed since the communication unit 1004 receives one of the image orientation changing command and the coordinate orientation changing command, if the other command is not received, the control unit 1001 may end the automatic coordinate orientation changing command or the automatic image orientation changing command.

In this way, when the user wants to execute one of the image orientation changing command and the coordinate orientation changing command, the command can be executed after the certain time period has elapsed since the reception of the command. Alternatively, when the user wants to execute both of the image orientation changing command and the coordinate orientation changing command, the inconsistency between the orientation of the coordinate system of the image pickup apparatus 1000 and the image orientation of the captured image can be prevented in a period from reception of one command to reception of the other command.

In addition, in response to each of the commands illustrated in FIGS. 5A to 5C described in the first embodiment, a normal response or an error response may be sent to the client at the requesting source. That is, when the image pickup apparatus 1000 normally executes a command from the client 3000, the image pickup apparatus 1000 sends a normal response to the client 3000 at the source requesting the command. Alternatively, when the image pickup apparatus 1000 does not normally execute a command from the client 3000, the image pickup apparatus 1000 sends an error response to the client 3000 at the source requesting the command. In this way, the client can more easily understand the processing result and processing timing of each command.

While one of the image orientation changing command and the coordinate orientation changing command is being executed, when the same command is consecutively received, an error response may be sent to these commands. In this way, when the communication unit 1004 consecutively receives one of the image orientation changing command and the coordinate orientation changing command, the control unit 1001 can execute control to execute only the firstly received command.

Also in the present embodiment, the case in which the image orientation changing command and the coordinate orientation changing command are separately defined has been described. In addition to these commands, a command for changing both of the image orientation and the coordinate orientation, such as that illustrated in FIG. 5D, may be defined.

Second Embodiment

In a second embodiment, the case in which the present invention is applied to an image pickup apparatus 2000 with the so-called digital PTZ (Pan Tilt Zoom) function, which changes a captured image displayed on a client by changing a region for trimming the captured image, will be described.

Also, in the second embodiment, the case in which plural clients 3000 are connected to the image pickup apparatus 2000 via the network 3020 will be described.

Further, in the second embodiment, an example will be described in which, in response to commands from the clients 3000, normal responses indicating that the commands are normally executed or error responses indicating that the commands are not executed are given.

Figure 1C:
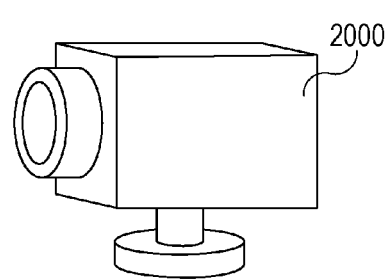
FIG. 1C is a diagram for describing the configuration of the image pickup apparatus according to the present invention.

FIG. 1C illustrates an image pickup apparatus 2000 according to the second embodiment. The image pickup apparatus 2000 according to the present embodiment does not include the panning drive mechanism 1101, the tilting drive mechanism 1102, and the zooming mechanism 1103.

Next, the internal configuration of the image pickup apparatus 2000 will be described using FIG. 2B.

The memory 1002 of the image pickup apparatus 2000 holds information indicating that the control unit 1001 has executed the automatic coordinate orientation changing process or the automatic image orientation changing process, as in the first embodiment. Further, in the present embodiment, the memory 1002 holds information indicating which of the plural clients connected to the network 3020 has given a command, in response to which the automatic coordinate orientation changing process or the automatic image orientation changing command has been executed.

Compared with the image pickup apparatus 1000 according to the first embodiment, the image pickup apparatus 2000 does not include the image pickup control unit 1006. The control unit 1001 of the image pickup apparatus 2000 generates a cut-out captured image by cutting out a portion of a captured image obtained by the image pickup unit 1003, and sends the cut-out captured image to the client 3000 via the communication unit 1004.

The image pickup apparatus 2000 according to the second embodiment receives, as a trimming parameter, an instruction for the cut-out position of the captured image from the client 3000. The trimming parameter is a parameter for specifying a portion to be trimmed from the captured image generated by the image pickup unit 1003 and to be distributed to the client. The trimming parameter includes two points (x1, y1) and (x2, y2) represented by the X-coordinates indicating the horizontal direction of the captured image and the Y-coordinates indicating the vertical direction of the captured image. A rectangle having these two points as opposite angles indicates the range to be trimmed.

Further, the image pickup apparatus 2000 according to the second embodiment can receive an image coordinate orientation changing command from the client 3000. FIG. 5D illustrates an example of the image coordinate orientation changing command. Using the image coordinate orientation changing command, the client 3000 can change the orientation of the captured image distributed by the image pickup apparatus 2000, together with the orientation of the coordinates of the image capturable range. The details of changing the image orientation and changing the coordinate orientation are the same as or similar to the contents described using FIGS. 5B and 5C in the first embodiment, and a description thereof will be omitted.

In the second embodiment, when the image pickup apparatus 2000 normally processes a command from the client 3000, the image pickup apparatus 2000 sends a normal response to the client 3000 at the source requesting the command. Alternatively, when the image pickup apparatus 2000 does not normally process a command from the client 3000, the image pickup apparatus 2000 sends an error response to the client 3000 at the source requesting the command. FIG. 5E illustrates an example of the normal response. FIG. 5F illustrates an example of the error response.

Next, the operation of the image pickup apparatus 2000 according to the second embodiment will be described using the flowcharts illustrated in FIG. 8 and FIGS. 9A to 9C. In the configuration in which the control unit 1001 of the image pickup apparatus 2000 includes the processor, the processing flow illustrated in FIG. 8 and FIGS. 9A to 9C indicates a program for causing the control unit 1001 to execute procedures illustrated in FIG. 8 and FIGS. 9A to 9C. The processor included in the control unit 1001 of the image pickup apparatus 2000 is a computer, and the processor executes a program read from the built-in memory 1002 included in the image pickup apparatus 2000. Alternatively, the processes illustrated in FIG. 8 and FIGS. 9A to 9C may be executed by hardware.

Figure 8:
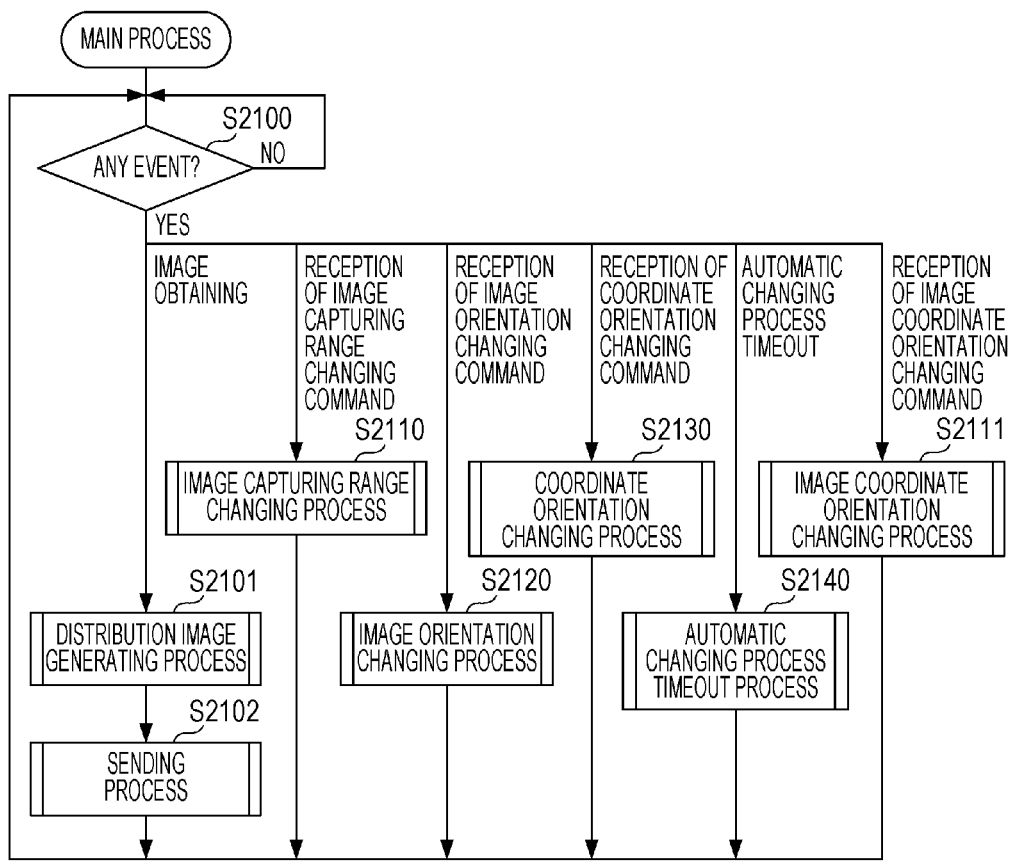
FIG. 8 is a flowchart for describing the operation of an image pickup apparatus according to a second embodiment.

A main process executed by the image pickup apparatus 2000 will be described using FIG. 8. At first, the control unit 1001 waits for an event (S2100). In the present embodiment, the image pickup apparatus 2000 determines that there is an event when an event of reception of the image coordinate orientation changing command occurs, besides an event of image obtaining, reception of the image capturing range changing command, reception of the image orientation changing command, reception of the coordinate orientation changing command, or automatic changing process timeout occurs.

When an image obtaining event occurs, the control unit 1001 of the image pickup apparatus 2000 executes a distribution image generating process (S2101). Regarding the distribution image generating process according to the present embodiment, a point different from the process described using FIG. 4A in the first embodiment will be described. In the present embodiment, in the distribution image generating process, when the image orientation parameter is OFF (normal orientation) (No in step S1200 in FIG. 4A), the control unit 1001 trims the captured image in accordance with the trimming parameter. Here, trimming means cutting out a captured image in a region specified by the trimming parameter, from the image capturing range of the image pickup unit 1003.

Alternatively, when the image orientation parameter is ON (inverted orientation) (Yes in S1200), the control unit 1001 changes the image orientation in accordance with the image orientation parameter in step S1201 illustrated in FIG. 4A, and then trims the captured image in accordance with the trimming parameter. After trimming the captured image, the control unit 1001 overwrites the captured image stored in the memory 1002 with the trimmed captured image, and ends the distribution image generating process.

When the distribution image generating process ends, the control unit 1001 executes a sending process (S2102). In the sending process, the control unit 1001 sends, via the communication unit 1004, the distribution image, trimmed in the distribution image generating process in step S2101, to the client 3000 requesting video distribution from the image pickup apparatus 2000. After executing the sending process, the control unit 1001 returns to step S2100 and executes processing.

Alternatively, when the control unit 1001 receives the image capturing range changing command from the client 3000, the control unit 1001 executes an image capturing range changing process (S2110). In the present embodiment, the image capturing range changing command is used to change the range for cutting out an image in the image capturing range. Regarding the image capturing range changing process in the present embodiment, a point different from the process described using FIG. 4B in the first embodiment will be described. In the image capturing range changing process, after the control unit 1001 according to the present embodiment executes processing in step S1300 and step S1301 illustrated in FIG. 4B, the control unit 1001 calculates a trimming parameter in step S1302 in FIG. 4B. That is, when the obtained coordinate orientation parameter is ON (inverted orientation), the control unit 1001 inverts the coordinate system, as in the coordinates 1083 illustrated in FIG. 7, and determines the trimming range. In contrast, when the obtained coordinate orientation parameter is OFF (normal orientation), the control unit 1001 does not invert the coordinate system, as in the coordinates 1082 illustrated in FIG. 7, and determines the trimming range.

Then, the control unit 1001 in the present embodiment obtains the position of the trimming range at the coordinates in units of pixels. Coordinates 2082 and coordinates 2083 illustrated in FIG. 7 are coordinates having the lower-left vertex as the origin and being represented by the X coordinates and the Y coordinates in units of pixels. As indicated at the coordinates 2082 and the coordinates 2083 illustrated in FIG. 7, the control unit 1001 calculates, as a trimming parameter, two pixel-coordinate points (x1, y1) and (x2, y2) on the captured image, corresponding to two vertices defining the opposite angles of the determined trimming range. The control unit 1001 stores the calculated trimming parameter in the memory 1002. The control unit 1001 ends the image capturing range changing process.

Figure 9A:
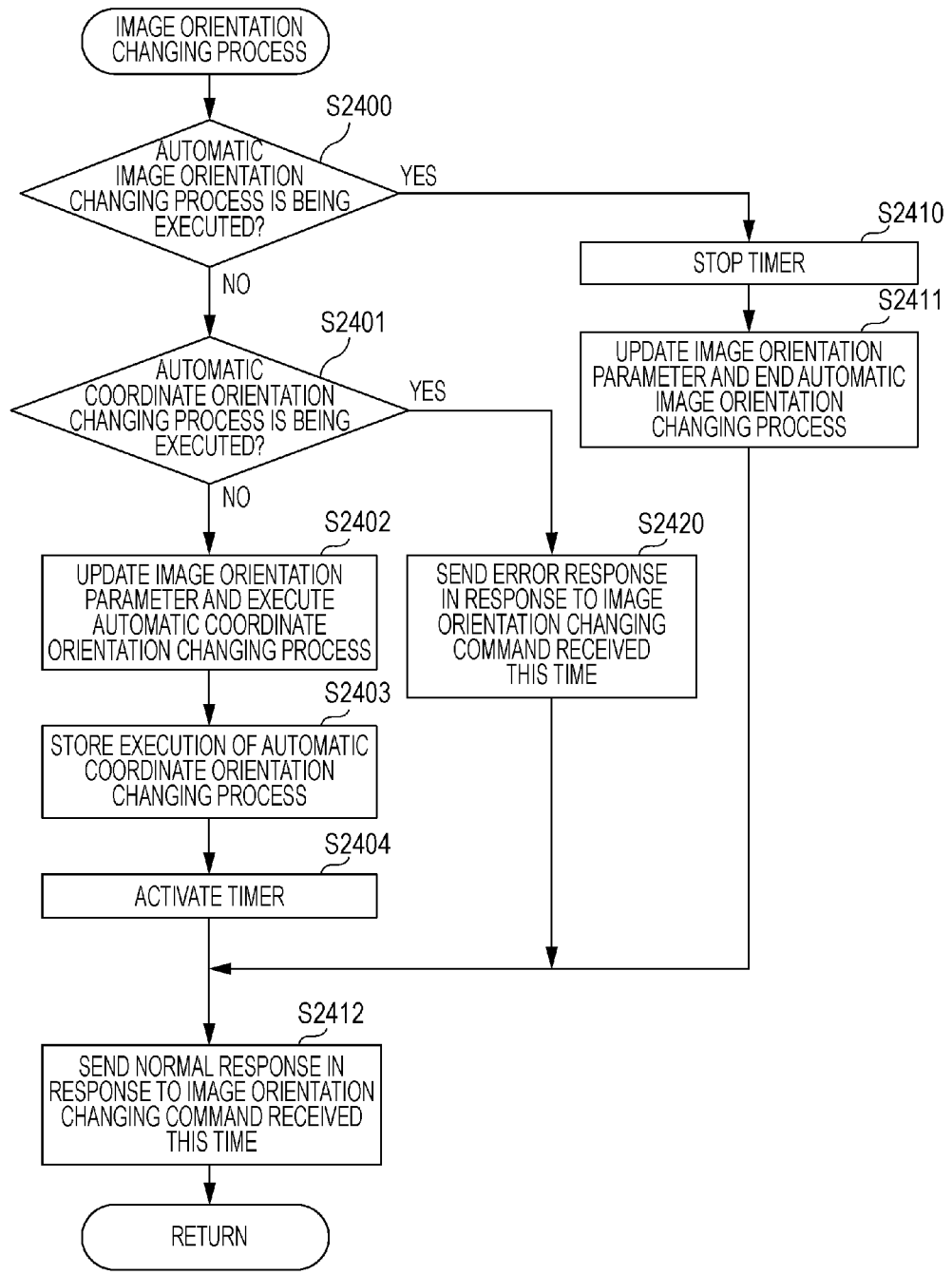
FIG. 9A is a flowchart for describing the details of the operation of the image pickup apparatus according to the second embodiment.

Alternatively, when the control unit 1001 according to present embodiment receives the image orientation changing command from the client 3000, the control unit 1001 executes an image orientation changing process described later using FIG. 9A (S2120).

Figure 9B:
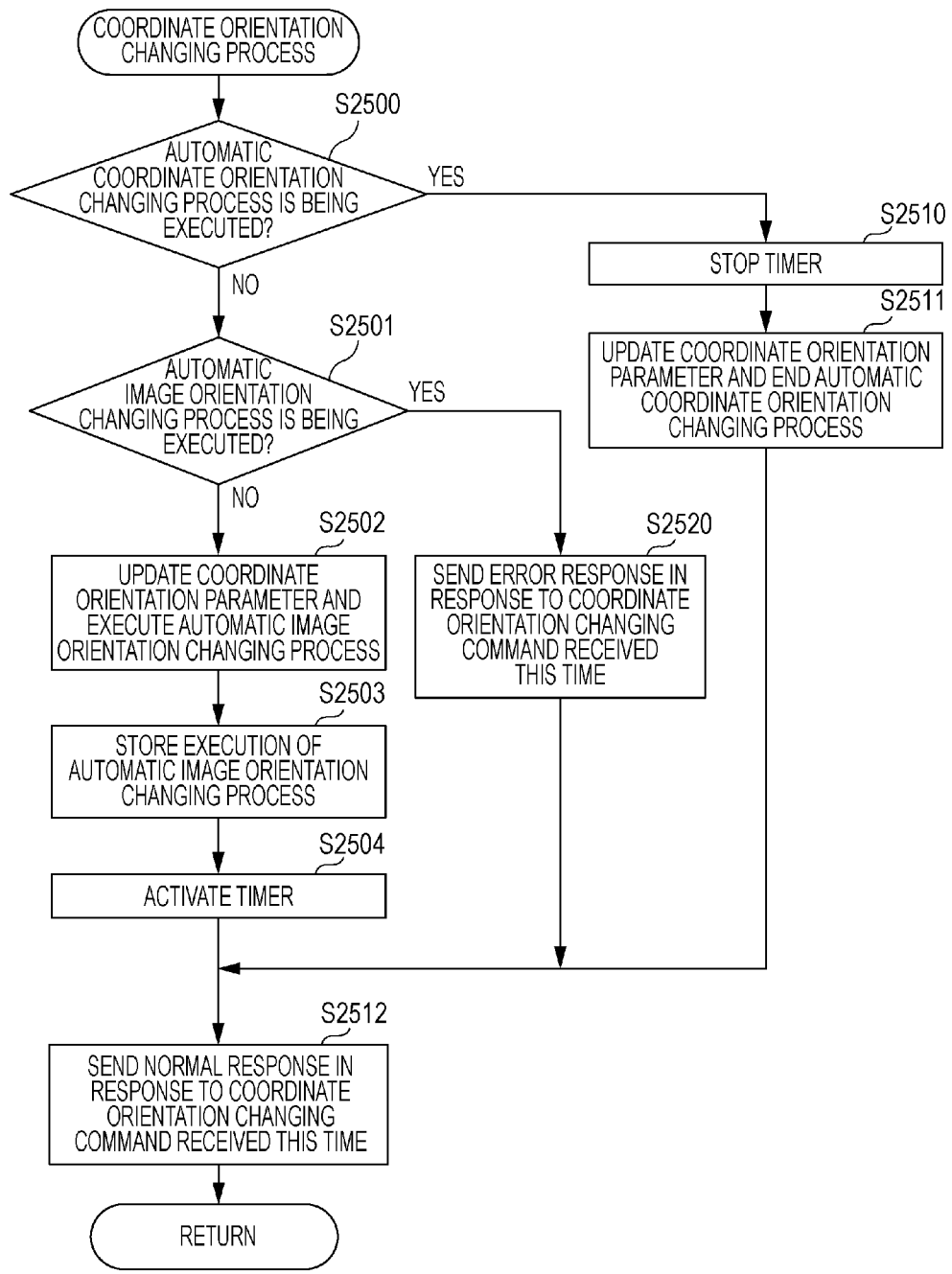
FIG. 9B is a flowchart for describing the details of the operation of the image pickup apparatus according to the second embodiment.

Alternatively, when the control unit 1001 according to the present embodiment receives the coordinate orientation changing command from the client 3000, the control unit 1001 executes a coordinate orientation changing process described later using FIG. 9B (S2130).

Alternatively, when a certain time period elapses after execution of one of the automatic image orientation changing process and the automatic coordinate orientation changing process, the control unit 1001 according to the present embodiment executes an automatic changing process timeout process (S2140). Alternatively, the control unit 1001 may execute the automatic changing process timeout process, when a certain time period elapses after execution of one of the image orientation changing command and the coordinate orientation changing command.

Alternatively, when the control unit 1001 according to the present embodiment receives the image coordinate orientation changing command illustrated in FIG. 5D from the client 3000, the control unit 1001 executes an image coordinate orientation changing process described later using FIG. 9C (S2111). After ending the processing in step S2111, the control unit 1001 returns to step S2100 and executes processing.

Next, the image orientation changing process in step S2120 will be described using FIG. 9A. At first, the control unit 1001 refers to the memory 1002 and determines whether the automatic image orientation changing process is being executed in response to the coordinate orientation changing command received from the client 3000 that has sent the image orientation changing command (S2400).

Here, the automatic image orientation changing process is, as has been described in the first embodiment, a process executed, prior to reception of the image orientation changing command, when the communication unit 1004 receives the coordinate orientation changing command. That is, when the automatic image orientation changing process is being executed, the communication unit 1004 has already received the coordinate orientation changing command. When the automatic image orientation changing process is not being executed, the communication unit 1004 has not received the coordinate orientation changing command.

Determination in step S2400 is performed by referring to the memory 1002. As in the first embodiment, the memory 1002 holds information indicating whether the automatic image orientation changing process has been executed. Further, the memory 1002 in the present embodiment holds information indicating which of the plural clients connected to the image pickup apparatus 2000 via the network 3020 has sent the coordinate orientation changing command, in response to which the automatic image orientation changing process has been executed. When executing the automatic image orientation changing process, the control unit 1001 executes control to hold, in the memory 1002, information indicating which of the clients has sent the coordinate orientation changing command, in response to which the automatic image orientation changing process is to be executed.

When the automatic image orientation changing process is not being executed (No in S2400), the control unit 1001 executes processing in step S2401. That is, the control unit 1001 determines whether the automatic coordinate orientation changing process is being executed in response to another image orientation changing command sent before the client 3000, which has sent the image orientation changing command, sends the image orientation changing command (S2401).

Here, the automatic coordinate orientation changing process is, as has been described in the first embodiment, a process executed, prior to reception of the coordinate orientation changing command, when the communication unit 1004 receives the image orientation changing command. That is, when the automatic coordinate orientation changing process is being executed, the communication unit 1004 has already received the image orientation changing command. When the automatic coordinate orientation changing process is not being executed, the communication unit 1004 has not received the image orientation changing command.

Determination in step S2401 is performed by referring to the memory 1002. As in the first embodiment, the memory 1002 holds information indicating whether the automatic coordinate orientation changing process has been executed. Further, the memory 1002 in the present embodiment holds information indicating which of the plural clients connected to the image pickup apparatus 2000 via the network 3020 has sent the image orientation changing command, in response to which the automatic coordinate orientation changing process has been executed. When executing the automatic coordinate orientation changing process, the control unit 1001 executes control to hold, in the memory 1002, information indicating which of the clients has sent the image orientation changing command, in response to which the automatic coordinate orientation changing process is to be executed.

When the automatic coordinate orientation changing process is being executed (Yes in S2401), the control unit 1001 sends an error response in response to the currently-received image orientation changing command (S2420). That is, when the image orientation changing command has already been received from the client at the source of the image orientation changing command currently received by the communication unit 1004, the control unit 1001 sends an error response in response to the currently-received image orientation changing command.

When the control unit 1001 consecutively receives the image orientation changing commands as above, the control unit 1001 executes control to only execute the firstly received image orientation changing command. In this way, the image pickup apparatus 2000 according to the present embodiment can prevent overlapping execution of the image orientation changing commands in response to the commands from the same client.

When the automatic coordinate orientation changing process is not being executed (No in S2401), the control unit 1001 reads the argument of the received image orientation changing command, and changes the image orientation parameter in the memory 1002. Further, the control unit 1001 executes the automatic coordinate orientation changing process (S2402).

When the automatic coordinate orientation changing process is started in step S2402, the control unit 1001 holds, in the memory 1002, information indicating that the automatic coordinate orientation changing process has been executed (S2403). Information indicating that the automatic coordinate orientation changing process is being executed can be held in the memory 1002, as has been described in the first embodiment.

The control unit 1001 uses the timing unit 1005 and activates a timer for the client which has sent the image orientation changing command received this time (S2404).

Next, the control unit 1001 sends a normal response, in response to the image orientation changing command executed in step S2402, to the client which has sent the image orientation changing command (S2412).

When the control unit 1001 in the present embodiment receives the image orientation changing command as above, the control unit 1001 executes the image orientation changing command and the coordinate orientation changing command prior to a coordinate orientation changing command from the client which has sent the image orientation changing command. The image orientation changing command is the image orientation changing command received by the communication unit 1004. Also, the coordinate orientation changing command is a command executed when the control unit 1001 executes the automatic coordinate orientation changing process in step S2402.

Thus, the inconsistency between the coordinate orientation (normal orientation/inverted orientation) and the image orientation (normal orientation/inverted orientation) of the captured image, which is caused by changing only the image orientation (captured image 1072 illustrated in FIG. 6) while keeping the coordinate orientation unchanged (coordinates 2082 illustrated in FIG. 7), can be prevented.

In contrast, when the automatic image orientation changing process is being executed (Yes in S2400), the control unit 1001 deletes the timer for the client which has sent the image orientation changing command (S2410).

The control unit 1001 reads the argument of the received image orientation changing command, and changes the image orientation parameter in the memory 1002. Also, the control unit 1001 ends the automatic image orientation changing process (S2411).

Next, the control unit 1001 sends a normal response, in response to the image orientation changing command executed in step S2411, to the client which has sent the image orientation changing command (S2412).

When the control unit 1001 receives the image orientation changing command while executing the automatic image orientation changing process, the control unit 1001 ends the automatic image orientation changing process, and executes the image orientation changing command and the coordinate orientation changing command. The image orientation changing command is the image orientation changing command received by the communication unit 1004. Also, the coordinate orientation changing command is the coordinate orientation changing command received by the communication unit 1004 prior to the execution of the automatic image orientation changing process.

Accordingly, the image pickup apparatus 2000 can output the captured image whose image orientation has been changed (captured image 1072 illustrated in FIG. 6), and change the image capturing range on the basis of the changed coordinates (coordinates 2083 illustrated in FIG. 7). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 2000 can execute the image orientation changing command while controlling the image capturing direction and the coordinate orientation to always match each other.

In the present embodiment, in steps S2400 and S2401, the control unit 1001 determines whether the automatic image orientation changing process or the automatic coordinate orientation changing process is a process executed in response to a command from the client that has sent the image orientation changing command. In this way, upon receipt of the image orientation changing command from a client, prior to reception of the coordinate orientation changing command from the same client, the image orientation changing command and the coordinate orientation changing command can be executed. Accordingly, control to execute both commands while controlling the image orientation and the coordinate orientation to match each other can be executed for each client.

Alternatively, in steps S2400 and S2401, the control unit 1001 may not determine whether the command is a command from the client 3000 which has sent the image orientation changing command. In this case, when a pair of commands is given to the image pickup apparatus 2000, without making a distinction among the clients, both commands are executed. Thus, even when plural clients give the image orientation changing command or the coordinate orientation changing command, the image pickup apparatus 2000 can execute both commands while controlling the image orientation and the coordinate orientation to match each other.

Next, the coordinate orientation changing process in step S2130 will be described using FIG. 9B. In the coordinate orientation changing process, a process that is the same as or similar to the above-described image orientation changing process is performed.

At first, the control unit 1001 refers to the memory 1002, and determines whether the automatic coordinate orientation changing process is being executed in response to the image orientation changing command received from the client 3000 which has sent the coordinate orientation changing command (S2500).

When the automatic coordinate orientation changing process is not being executed (No in S2500), the control unit 1001 determines whether the automatic image orientation changing process is being executed (S2501).

When the automatic image orientation changing process is being executed (Yes in S2501), the control unit 1001 sends an error response in response to the currently-received coordinate orientation changing command (S2520). That is, when the communication unit 1004 has already received the coordinate orientation changing command, the control unit 1001 sends an error response in response to the currently-received coordinate orientation changing command.

When the control unit 1001 consecutively receives the coordinate orientation changing commands as above, the control unit 1001 executes control to only execute the firstly received coordinate orientation changing command. In this way, the image pickup apparatus 2000 according to the present embodiment can prevent overlapping execution of the coordinate orientation changing commands.

When the automatic image orientation changing process is not being executed (No in S2501), the control unit 1001 reads the argument of the received coordinate orientation changing command, and changes the coordinate orientation parameter in the memory 1002. Further, the control unit 1001 executes the automatic image orientation changing process (S2502).

The control unit 1001 uses the timing unit 1005 and activates a timer for the client which has sent the coordinate orientation changing command received this time (S2504).

Next, the control unit 1001 sends a normal response, in response to the coordinate orientation changing command executed in step S2502, to the client which has sent the coordinate orientation changing command (S2512).

When the control unit 1001 in the present embodiment receives the coordinate orientation changing command as above, prior to the image orientation changing command from the client which has sent the coordinate orientation changing command, the control unit 1001 executes the coordinate orientation changing command and the image orientation changing command. The coordinate orientation changing command is the coordinate orientation changing command received by the communication unit 1004. Also, the image orientation changing command is a command executed when the control unit 1001 executes the automatic image orientation changing process in step S2502.

Thus, the inconsistency between the coordinate orientation (normal orientation/inverted orientation) and the image orientation (normal orientation/inverted orientation) of the captured image, which is caused by changing only the coordinate orientation (coordinates 2083 illustrated in FIG. 7) while keeping the image orientation unchanged (captured image 1071 illustrated in FIG. 6), can be prevented.

In contrast, when the automatic coordinate orientation changing process is being executed (Yes in S2500), the control unit 1001 deletes the timer for the client which has sent the coordinate orientation changing command (S2510).

The control unit 1001 reads the argument of the received coordinate orientation changing command, and changes the coordinate orientation parameter in the memory 1002. Also, the control unit 1001 ends the automatic coordinate orientation changing process (S2511).

Next, the control unit 1001 sends a normal response, in response to the coordinate orientation changing command executed in step S2511, to the client which has sent the coordinate orientation changing command (S2512).

When the control unit 1001 receives the coordinate orientation changing command while executing the automatic coordinate orientation changing process as above, the control unit 1001 ends the automatic coordinate orientation changing process, and executes the coordinate orientation changing command and the image orientation changing command. The coordinate orientation changing command is the coordinate orientation changing command received by the communication unit 1004. Also, the image orientation changing command is the image orientation changing command received by the communication unit 1004 prior to the execution of the automatic coordinate orientation changing process.

Accordingly, the image pickup apparatus 2000 can output the captured image whose image orientation has been changed (captured image 1072 illustrated in FIG. 6), and change the image capturing range on the basis of the changed coordinates (coordinates 2083 illustrated in FIG. 7). Thus, the captured image can be output in a state in which the image orientation (normal orientation/inverted orientation) and the coordinate orientation (normal orientation/inverted orientation) match each other, and the image capturing range can be changed.

In this manner, the image pickup apparatus 2000 can execute the coordinate orientation changing command while controlling the image capturing direction and the coordinate orientation to always match each other.

In the present embodiment, in steps S2500 and S2501, the control unit 1001 determines whether the automatic image orientation changing process or the automatic coordinate orientation changing process is a process executed in response to a command from the client which has sent the coordinate orientation changing command. In this way, upon receipt of the coordinate orientation changing command from a client, prior to reception of the image orientation changing command from the same client, the image orientation changing command and the coordinate orientation changing command can be executed. Accordingly, control to execute both commands while controlling the image orientation and the coordinate orientation to match each other can be executed for each client.

Alternatively, from when the communication unit 1004 receives, from a first client, one of the image orientation changing command and the coordinate orientation changing command to when the communication unit 1004 receives, from the first client, the other one of the image orientation changing command and the coordinate orientation changing command, the control unit 1001 may not execute the image orientation changing command and the coordinate orientation changing command received from a second client. That is, until a pair of the image orientation changing command and the coordinate orientation changing command is received from a client, an error response may be sent in response to the image orientation changing client or the coordinate orientation changing command from another client.

In this way, the image pickup apparatus 2000 can be controlled without allowing a client that has sent one of the image orientation changing command and the coordinate orientation changing command to be influenced by a command from another client. Accordingly, the image orientation and the coordinate orientation of the image pickup apparatus 2000 can be controlled to always match each other.

Alternatively, in steps S2500 and S2501, the control unit 1001 may not determine whether the command is a command from the client which has sent the coordinate orientation changing command. In this case, when a pair of commands is given to the image pickup apparatus 2000, without making a distinction among the clients, both commands are executed. Thus, even when the plural clients give the image orientation changing command or the coordinate orientation changing command, the image pickup apparatus 2000 can execute both commands while controlling the image orientation and the coordinate orientation to match each other.

Next, the automatic changing process timeout process in step S2140 of the flow in FIG. 8 will be described. When timeout occurs, the control unit 1001 can control the image orientation or the coordinate orientation to be restored to a state before the execution of the automatic changing process (automatic image orientation changing process or automatic coordinate orientation changing process). That is, when the automatic image orientation changing process has been executed, the control unit 1001 rotates the image orientation of the cut-out captured image to be restored to a state before the execution of the automatic image orientation changing process. Alternatively, when the automatic coordinate orientation changing process has been executed, the control unit 1001 rotates the coordinate orientation to be restored to a state before the execution of the automatic coordinate orientation changing process.

When the image orientation or the coordinate orientation is rotated to be restored to a state before the execution of the automatic changing process, the control unit 1001 holds, in the memory 1002, information indicating that the image orientation or the coordinate orientation is restored to a state before the execution of the automatic image orientation changing process or the automatic coordinate orientation changing process. For example, the control unit 1001 can unset the flag in the memory 1002, which has been set upon the execution of the automatic image orientation changing process or the automatic coordinate orientation changing process.

In this way, even when the coordinate orientation and the image orientation of the captured image become inconsistent with each other due to the execution of a command, the command from the client can be executed as instructed, after a certain time period has elapsed.

Alternatively, when timeout occurs, the control unit 1001 can execute control to rotate the image orientation of the cut-out captured image and the coordinate orientation to be restored to a state before the communication unit 1004 receives the image orientation changing command or the coordinate orientation changing command. That is, when the communication unit 1004 receives the image orientation changing command and the control unit 1001 executes the image orientation changing command and the automatic coordinate orientation changing process in response thereto, the control unit 1001 rotates the captured image to be restored to a state before the execution of the image orientation changing command. Further, the control unit 1001 rotates the coordinate orientation to be restored to a state before the execution of the automatic coordinate orientation changing process. Alternatively, when the communication unit 1004 receives the coordinate orientation changing command and the control unit 1001 executes the coordinate orientation changing command and the automatic image orientation changing process in response thereto, the control unit 1001 rotates the coordinate orientation to be restored to a state before the execution of the coordinate orientation changing command. Further, the control unit 1001 rotates the image orientation to be restored to a state before the execution of the automatic image orientation changing process.

When the image orientation or the coordinate orientation is rotated to be restored to a state before the execution of the automatic changing process, the control unit 1001 holds, in the memory 1002, information indicating that the image orientation or the coordinate orientation is restored to a state before the execution of the automatic image orientation changing process or the automatic coordinate orientation changing process.

Further, the control unit 1001 notifies a client that has sent the image orientation changing command or the coordinate orientation changing command of the fact that the image orientation or the coordinate orientation of the cut-out captured image is restored to a state before the execution of the image orientation changing command or the coordinate orientation changing command.

In this way, execution of only one of the coordinate orientation changing command and the image orientation changing command does not occur. Therefore, the inconsistency between the coordinate orientation and the image orientation can be prevented.

As above, when no image orientation changing command is received even when a certain time period has elapsed since the execution of the automatic image orientation changing process, the control unit 1001 can rotate the captured image and the coordinate system to be restored to a state before the execution of the coordinate orientation changing command, which is received by the communication unit 1004, and the automatic image orientation changing process.

Similarly, when no coordinate orientation changing command is received even when a certain time period has elapsed since the execution of the automatic coordinate orientation changing process, the control unit 1001 can rotate the captured image and the coordinate system to be restored to a state before the execution of the image orientation changing command, which is received by the communication unit 1004, and the automatic coordinate orientation changing process.

In the above-described example, the example in which the timing unit 1005 starts counting after the execution of the automatic image orientation changing process or the automatic coordinate orientation changing process has been described. Alternatively, the timing unit 1005 may start counting upon the reception of the image orientation changing command or the coordinate orientation changing command.

In this way, even when a certain time period has elapsed after one of the image orientation changing command and the coordinate orientation changing command is received, if the other command is not received, the control unit 1001 can execute control to rotate the captured image and the coordinate system to be restored to a state before the execution of the image orientation changing command and the coordinate orientation changing command.

Next, the image coordinate orientation changing process will be described using FIG. 9C. At first, the control unit 1001 refers to the memory 1002 and determines whether the automatic changing process (automatic image orientation changing process or automatic coordinate orientation changing process) is being executed (S2700). When the automatic changing process is being executed (Yes in S2700), the control unit 1001 uses the timing unit 1005 to delete all the active timers (S2710).

Here, when the control unit 1001 is executing the automatic changing process, the image pickup apparatus 2000 is in a state in which only one of the image orientation changing command and the coordinate orientation changing command is received from a client. After performing processing in step S2710, the control unit 1001 rotates the image orientation or the coordinate orientation to be restored to a state before the execution of the command received from the client (S2711). The control unit 1001 moves the processing to step S2701 described later.

When the automatic image orientation changing process or the automatic coordinate orientation changing process is not being executed (No in S2700) or when the processing in step S2711 ends, the control unit 1001 executes processing in step S2701. In step S2701, the control unit 1001 updates both the image orientation parameter and the coordinate orientation parameter in the memory 1002 in accordance with the arguments of the image/coordinate orientations in the received image coordinate orientation changing command. Next, the control unit 1001 sends a normal response to the source of the image coordinate orientation changing command (S2702).

In this manner, when the control unit 1001 receives the image coordinate changing command while executing the automatic image orientation changing process or the automatic coordinate orientation changing process, the control unit 1001 changes the image orientation and the coordinate orientation to be restored to a state before the execution of the command received by the communication unit 1004 and the automatic changing process, and then executes the image coordinate orientation changing command.

Accordingly, the image pickup apparatus 2000 can output the captured image whose image orientation has been changed (captured image 1072 illustrated in FIG. 6), and change the image capturing range on the basis of the changed coordinates (coordinates 2083 illustrated in FIG. 7). Thus, the image pickup apparatus 2000 can output the captured image in a state in which the image orientation (normal orientation/inverted orientation) and the coordinate orientation (normal orientation/inverted orientation) match each other, and change the image capturing range.

With the above processing, the image pickup apparatus 2000 can prevent a state in which only one of the orientation of the image and the orientation of the coordinates of the image capturable range is changed. Also, the image pickup apparatus 2000 can appropriately process image orientation changing commands and coordinate orientation changing commands received from the plural clients, and can send normal/error responses.

In the present embodiment, processing in the case in which the plural clients 3000 are connected to the image pickup apparatus 2000 via the network 3020 has been described. Also, in the present amendment, processing in the case in which a normal response indicating that, in response to a command from one of the clients 3000, the command has been normally executed or an error response indicating that the command has not been executed is given has been described. Further, in the present embodiment, processing in the case in which the image coordinate orientation changing command is received from the client 3000 has been described. Such processing is not limited to the case in which the processing is applied to the image pickup apparatus 2000 with the so-called PTZ function, as in the present embodiment, and such processing is applicable to the image pickup apparatus 1000 described in the first embodiment.

Third Embodiment

In a third embodiment, a client application for causing the client 3000 to send the image orientation changing command illustrated in FIG. 5B or the coordinate orientation changing command illustrated in FIG. 5C to the image pickup apparatus 1000 will be described.

Figure 10A:
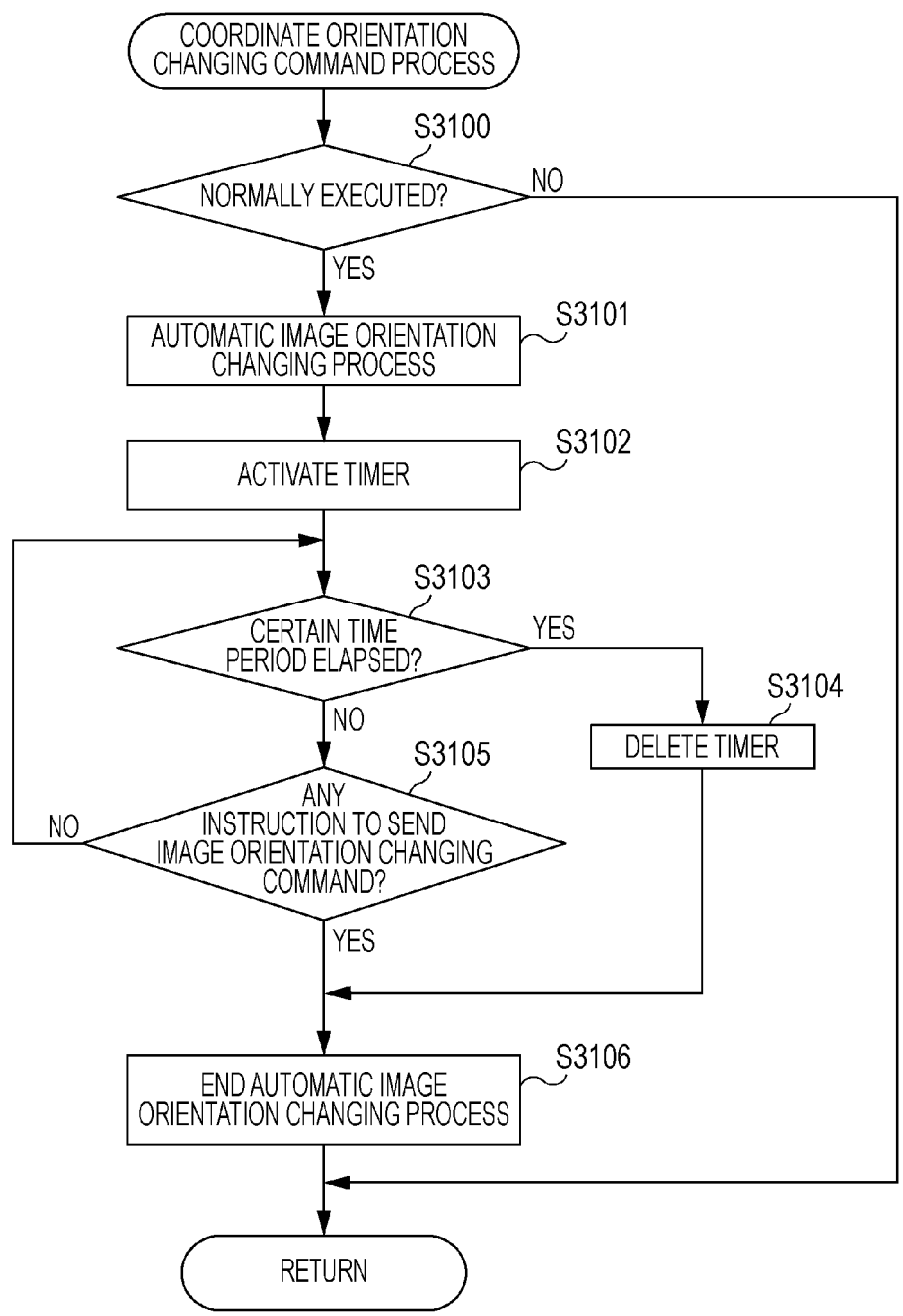
FIG. 10A is a flowchart for describing the operation of a control apparatus according to a third embodiment.
Figure 10B:
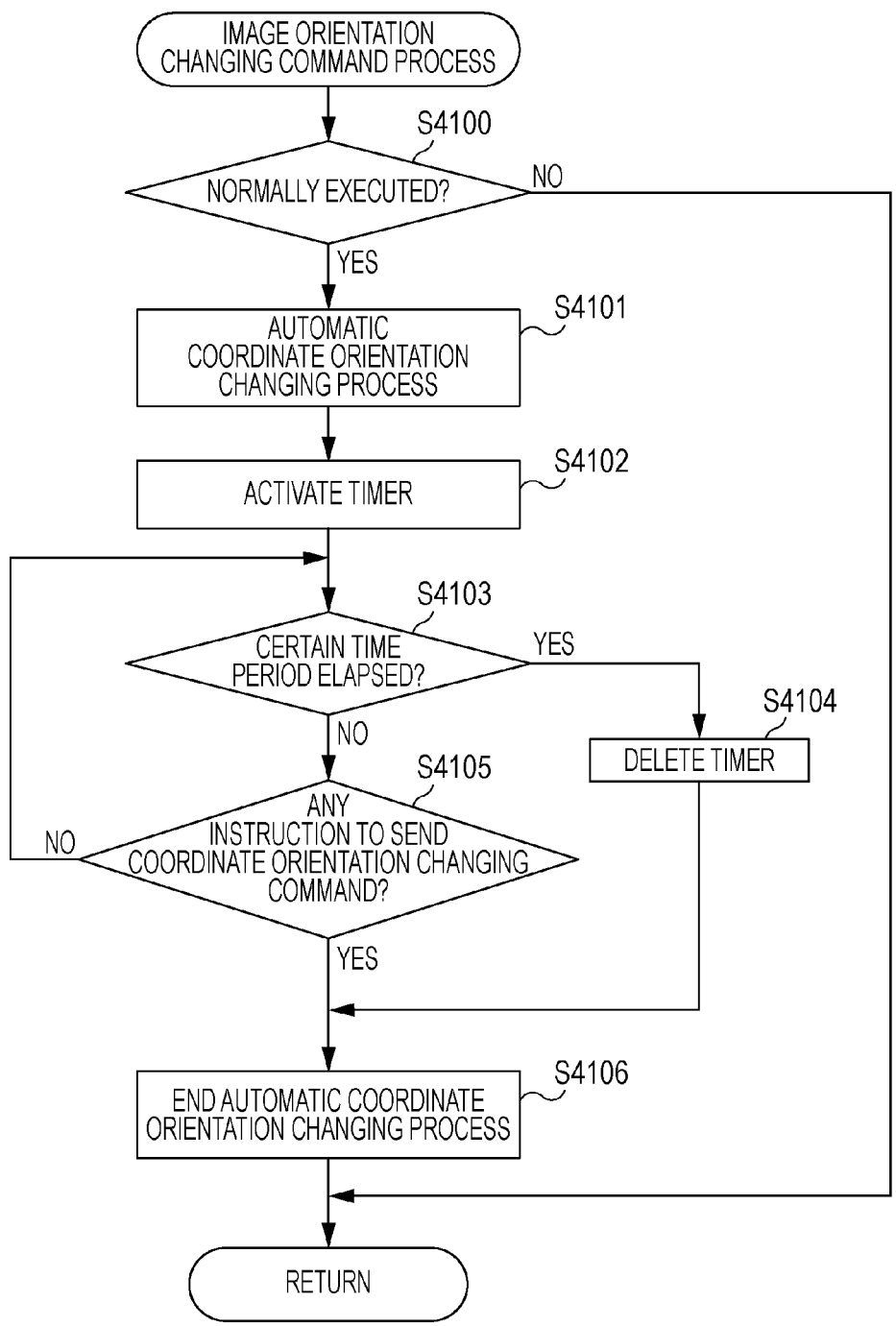
FIG. 10B is a flowchart for describing the operation of the control according to the third embodiment.

Processing executed when the client 3000 sends the coordinate orientation changing command or the image orientation changing command to the image pickup apparatus 1000 will be described using the flowcharts illustrated in FIGS. 10A and 10B. In a configuration in which the control unit 3001 of the client 3000 includes a processor, the processing flow illustrated in FIGS. 10A and 10B indicates a program for causing the control unit 3001 of the client 3000 to execute procedures illustrated in FIGS. 10A and 10B. The processor included in the control unit 3001 is a computer, and the processor executes a program read from the built-in memory 3002 included in the client 3000. Alternatively, the processes illustrated in FIGS. 10A and 10B may be executed using hardware.

First, the case in which the client 3000 sends the coordinate orientation changing command to the image pickup apparatus 1000 will be described using FIG. 10A.

When the user gives the client 3000 an instruction to send the coordinate orientation changing command to the image pickup apparatus 1000, the control unit 3001 determines whether the coordinate orientation changing command has been normally executed by the image pickup apparatus 1000 (S3100). For example, the control unit 3001 can determine whether the coordinate orientation changing command has been normally executed, on the basis of the contents of a response from the image pickup apparatus 1000 in response to the coordinate orientation changing command.

When the coordinate orientation changing command has not been normally executed by the image pickup apparatus 1000 (No in S3100), the control unit 3001 ends the process. In contrast, when the coordinate orientation changing command has been normally executed by the image pickup apparatus 1000 (Yes in S3100), the control unit 3001 executes the automatic image orientation changing process (S3101). Here, the automatic image orientation changing process is a process of automatically sending, upon receipt of an instruction to send the coordinate orientation changing command to the image pickup apparatus 1000, the image orientation changing command to the image pickup apparatus 1000 prior to reception of an instruction to send the image orientation changing command to the image pickup apparatus 1000.

After it has been determined that the image pickup apparatus 1000 has normally executed the coordinate orientation changing command, the image orientation changing command can be automatically sent to the image pickup apparatus 1000. As above, upon receipt of an instruction to send the coordinate orientation changing command to the image pickup apparatus 1000, the image pickup apparatus 1000 can be caused to execute the coordinate orientation changing command and the image orientation changing command, prior to an instruction from the client to send the image orientation changing command to the image pickup apparatus 1000.

In this way, the inconsistency between the image orientation of the captured image and the coordinate orientation can be prevented in a period from when the coordinate orientation changing command is normally executed to when the image orientation changing command is sent to the image pickup apparatus 1000 in response to an instruction from the client.

Next, the control unit 3001 activates a timer using the timing unit 3006 (S3102). The timer measures how much time has elapsed during the continuation of a state in which the image orientation of the captured image has been changed in response to the image orientation changing command automatically sent in step S3101.

Next, the control unit 3001 determines whether a certain time period has elapsed since the activation of the timer (S3103). The time period used in determination in step S3103 can be arbitrarily set. When the certain time period has elapsed since the activation of the timer (Yes in S3103), the control unit 3001 deletes the timer (S3104). The control unit 3001 ends the automatic image orientation changing process (S3106). The control unit 3001 sends, to the image pickup apparatus 1000, a command for rotating the current captured image in a direction opposite to that in which the captured image has been rotated in response to the image orientation changing command sent to the image pickup apparatus 1000 in step S3101, by the angle by which the captured image has been rotated in response to the image orientation changing command. In this manner, after the certain time period has elapsed since the image orientation changing command has been automatically sent to the image pickup apparatus 1000 in step S3101, the control unit 3001 rotates the captured image to be restored to a state before the image orientation changing command has been sent.

When it is determined in step S3103 that the certain time period has not elapsed since the activation of the timer (No in S3103), the control unit 3001 determines whether an instruction has been given from the user to send the image orientation changing command to the image pickup apparatus 1000 (S3105). When there is no instruction from the user (No in S3105), the control unit 3001 repeats the processing in step S3103.

In contrast, when an instruction has been given from the user to send the image orientation changing command to the image pickup apparatus 1000 (Yes in S3105), the control unit 3001 executes processing to end the automatic image orientation changing process executed in step S3101. That is, the control unit 3001 sends, to the image pickup apparatus 1000, a command for rotating the current captured image in a direction opposite to that in which the captured image has been rotated in response to the image orientation changing command sent to the image pickup apparatus 1000 in step S3101, by the angle by which the captured image has been rotated in response to the image orientation changing command. In this manner, overlapping execution of the image orientation changing command given in response to the user's instruction and the automatic image orientation changing command given in step S3101 can be prevented.

As above, when an instruction has been given from the user to send the image orientation changing command, the image pickup apparatus 1000 executes the coordinate orientation changing command sent in response to the user's instruction. Also, the image pickup apparatus 1000 executes the image orientation changing command sent in response to the user's instruction. Thus, the image orientation and the coordinate orientation are controlled to match each other.

Next, the case in which the client 3000 sends the image orientation changing command to the image pickup apparatus 1000 will be described using FIG. 10B. A process that is the same as or similar to that described using FIG. 10A is performed when the image orientation changing command is sent to the image pickup apparatus 1000.

When the user gives the client 3000 an instruction to send the image orientation changing command to the image pickup apparatus 1000, the control unit 3001 determines whether the image orientation changing command has been normally executed by the image pickup apparatus 1000 (S4100).

When the image orientation changing command has not been normally executed by the image pickup apparatus 1000 (No in S4100), the control unit 3001 ends the process.

In contrast, when the image orientation changing command has been normally executed by the image pickup apparatus 1000 (Yes in S4100), the control unit 3001 executes the automatic coordinate orientation changing process (S4101). Here, the automatic coordinate orientation changing process is a process of automatically sending, upon receipt of an instruction to send the image orientation changing command to the image pickup apparatus 1000, the coordinate orientation changing command to the image pickup apparatus 1000 prior to reception of an instruction to send the coordinate orientation changing command to the image pickup apparatus 1000.

Next, the control unit 3001 activates a timer using the timing unit 3006 (S4102). Next, the control unit 3001 determines whether a certain time period has elapsed since the activation of the timer (S4103).

When the certain time period has elapsed since the activation of the timer (Yes in S4103), the control unit 3001 deletes the timer (S3104). The control unit 3001 ends the automatic coordinate orientation changing process (S4106).

When it is determined in step S4103 that the certain time period has not elapsed since the activation of the timer (No in S4103), the control unit 3001 determines whether an instruction has been given from the user to send the coordinate orientation changing command to the image pickup apparatus 1000 (S4105). When there is no instruction from the user (No in S4105), the control unit 3001 repeats the processing in step S4103.

In contrast, when an instruction has been given from the user to send the coordinate orientation changing command to the image pickup apparatus 1000 (Yes in S4105), the control unit 3001 executes processing to end the automatic coordinate orientation changing process executed in step S4101.

As above, when the user gives an instruction to send the coordinate orientation changing command, the image pickup apparatus 1000 executes the image orientation changing command sent in response to the user's instruction. Also, the image pickup apparatus 1000 executes the coordinate orientation changing command sent in response to the user's instruction. Thus, the image orientation and the coordinate orientation are controlled to match each other.

In this manner, when the control unit 3001 receives an instruction to send one of the image orientation changing command and the coordinate orientation changing command to the image pickup apparatus 1000, the control unit 3001 executes control to cause, prior to reception of an instruction to send the other one of the image orientation changing command and the coordinate orientation changing command to the image pickup apparatus 1000, the image pickup apparatus 1000 to execute the image orientation changing command and the coordinate orientation changing command.

With the above processing, the client 3000 can prevent the image pickup apparatus 1000, serving as a target to be controlled, from entering a state in which only one of the orientation of the image and the orientation of the coordinates of the image capturable range is changed. Therefore, when the user wishes to change the image capturing range while looking at a captured image distributed from the image pickup apparatus 1000, the image capturing range can be changed to the same orientation as that of the distributed captured image. Thus, changes in the image capturing range in accordance with the user's intention can be realized.

Other Embodiments

The embodiments are not limited to the above-described embodiments, and the embodiments may be partially changed. In the first to third embodiments, the case in which the interfaces for changing the image orientation and the coordinate orientation specify one of the normal orientation/inverted orientation has been described. However, the embodiments are not limited to the above case. An interface capable of specifying rotation every 90 degrees or every degree may be used.

The present invention may also be realized by executing the following processing. That is, the processing is such that software (program) realizing the functions of the above-described embodiments is supplied to a system or an apparatus via a network or various storage media, and a computer (or a CPU, an MPU, etc.) in the system or the apparatus reads and executes the program.

According to the present invention, even when an image pickup apparatus independently receives a command for changing the orientation of a captured image to be displayed at a control apparatus and a command for changing the orientation of the coordinate system used for controlling the image capturing direction of the image pickup apparatus, the image capturing direction can be changed to a direction intended by a user.

Also, according to the present invention, even when a control apparatus independently sends a command for changing the orientation of a captured image to be displayed at the control apparatus and a command for changing the orientation of the coordinate system used for controlling the image capturing direction of an image pickup apparatus, the image capturing direction can be changed to a direction intended by a user.

The present invention is not restricted to the above-described embodiments, and various changes and modifications can be made without departing from the spirit and scope of the present invention. Thus, the following claims are appended to provide the scope of the invention to the public.

The invention claimed is:

1. A control apparatus comprising:
a communication unit configured to receive, via a network, at least one of a first command that instructs to rotate an image captured by an image pickup unit by 180 degrees, and a second command that instructs to reverse a control direction for changing an image capturing region captured by the image capturing unit; and
a control unit configured to execute, if the communication unit receives one of the first command and the second command, both of a first process corresponding to the first command and a second process corresponding to the second command, in response to the one of the first command and the second command,
wherein, if the communication unit receives a third command that specifies a first region for changing the image capturing region before the second process is executed, the control unit causes the image pickup unit to capture an image corresponding to the first region, and
wherein, if the communication unit receives the third command that specifies the first region for changing the image capturing region after the second process is executed, the control unit causes the image pickup unit to capture an image corresponding to a second region different from the first region.

2. The control apparatus according to claim 1, wherein the control unit is configured to execute, if the communication unit receives one of the first command and the second command, the first process and the second process prior to reception of the other one of the first command and the second command.

3. The control apparatus according to claim 1, wherein, if the communication unit does not receive the other one of the first command and the second command even if a certain time period has elapsed since reception of one of the first command and the second command, the control unit restores a state of the control apparatus to a state prior to execution of the first process and the second process.

4. The control apparatus according to claim 1, wherein, if the communication unit consecutively receives one of the first command and the second command, the control unit executes a process corresponding to the command consecutively received and does not executes a process corresponding to the other one of the first command and the second command.

5. The control apparatus according to claim 1,
wherein the communication unit is configured to receive commands from a plurality of communication apparatuses, and
wherein, from when the communication unit receives one of the first command and the second command from a first communication apparatus to when the communication unit receives the other one of the first command and the second command from the first communication apparatus, the control unit does not execute the first process and the second process.

6. The control apparatus according to claim 1, wherein the first command is a command for acquiring an image which has been reversed both top and bottom and left and right from the image captured by the image pickup unit.

7. The control apparatus according to claim 1, wherein the second command is a command for changing a state of the control unit from a first state where the control unit uses first coordinate system for specifying the image capturing region to a second state where the control unit uses a second coordinate system which has been reversed positive and negative of top and bottom and right and left from the first coordinate system for specifying the image capturing region.

8. The control apparatus according to claim 1, wherein the control unit executes the second process with the image capturing region not being changed, the image capturing region being a region in which the image pickup unit is aiming to capture an image.

9. The control apparatus according to claim 1, wherein the control unit is configured to execute, if the communication unit receives one of the first command and the second command, the first process and the second process, even if the communication unit does not receive the other of the first command and the second command.

10. The control apparatus according to claim 1, further comprising the image pickup unit.

11. The control apparatus according to claim 1, wherein the second region is a direction region opposite to the first region with reference to a predetermined position.

12. The control apparatus according to claim 1, wherein the first region specified by the third command is a position in a coordinate system.

13. A control apparatus comprising:
a communication unit configured to transmit, to an image capturing apparatus via a network, a first command that instructs to rotate an image captured by an image pickup unit of the image capturing apparatus by 180 degrees, and a second command that instructs to reverse a control direction for changing an image capturing region captured by the image capturing unit and
a control unit configured to control, if an instruction, to transmit one of the first command and the second command to the image capturing apparatus, is inputted to an input unit, to transmit both of the first command and the second command from the communication unit to the image capturing apparatus, in response to the instruction to transmit one of the first command and the second command to the image capturing apparatus,
wherein, the second command is a command for changing a state of the image capturing apparatus from a first state to a second state, the first state is a state in which the image pickup unit captures an image corresponding to a first region if a third command that specifies the first region for changing the image capturing region is transmitted from the communication unit to the image capturing apparatus, and the second state is a state in which the image pickup unit captures an image corresponding to a second region different from the first region if the third command that specifies the first region for changing the image capturing region is transmitted from the communication unit to the image capturing apparatus.

14. The control apparatus according to claim 13, wherein the control unit is configured to execute, if the instruction, to transmit one of the first command and the second command to the image capturing apparatus, is inputted to the input unit, control to cause the communication unit to transmit the first command and the second command to the image capturing apparatus prior to reception of an instruction to transmit the other one of the first command and the second command to the image capturing apparatus.

15. The control apparatus according to claim 13, wherein, upon receipt of the instruction to transmit one of the first command and the second command to the image capturing apparatus, the control unit controls to cause the communication unit to transmit a query output asking whether to transmit the other one of the first command and the second command together with one of the first command and the second command.

16. The control apparatus according to claim 13, wherein the control unit is configured to execute, if the instruction, to transmit one of the first command and the second command to the image capturing apparatus, is inputted to the input unit, control to cause the communication unit to transmit the first command and the second command to the image capturing apparatus, even if the instruction, to transmit the other of the first command and the second command to the image capturing apparatus, is not inputted to the input unit.

17. The control apparatus according to claim 13, wherein the first command is a command for acquiring an image which has been reversed both top and bottom and left and right from the image captured by the image pickup unit.

18. The control apparatus according to claim 13, wherein the second command is a command for changing a state of the control unit from a first state where the image capturing apparatus uses a first coordinate system for specifying the image capturing region to a second state the image capturing apparatus uses a second coordinate system which has been reversed positive and negative of top and bottom and right and left from the first coordinate system for specifying the image capturing region.

19. The control apparatus according to claim 13, further comprising the input unit.

20. The control apparatus according to claim 13, wherein the second region is a region opposite to the first region with reference to a predetermined position.

21. The control apparatus according to claim 13, wherein the first region specified by the third command is a position in a coordinate system.

22. A method for controlling an apparatus comprising:
receiving, via a network, at least one of a first command that instructs to rotate an image captured by an image pickup unit by 180 degrees, and a second command that instructs to reverse a control direction for changing an image capturing region captured by the image capturing unit; and
executing, if one of the first command and the second command is received, both of a first process corresponding to the first command and a second process corresponding to the second command, in response to the one of the first command and the second command,
wherein, if a third command that specifies a first region for changing the image capturing region is received before the second process is executed, the image pickup unit is controlled to capture an image corresponding to the first region, and
wherein, if the third command that specifies the first region for changing the image capturing region is received after the second process is executed, the image pickup unit is controlled to capture an image corresponding to a second region different from the first region.

23. A method for controlling an apparatus comprising:
transmitting, to an image capturing apparatus via a network, a first command that instructs to rotate an image captured an image pickup unit of the image capturing apparatus by 180 degrees, and a second command that instructs to reverse a control direction for changing an image capturing region captured by the image capturing unit; and
if an instruction, to transmit one of the first command and the second command to the image capturing apparatus, is inputted to an input unit, transmitting both of the first command and the second command to the image capturing apparatus, in response to the instruction to transmit one of the first command and the second command to the image capturing apparatus,
wherein, the second command is a command for changing a state of the image capturing apparatus from a first state to a second state, the first state is a state in which the image pickup unit captures an image corresponding to a first region if a third command that specifies the first region for changing the image capturing region is transmitted to the image capturing apparatus, and the second state is a state in which the image pickup unit captures an image corresponding to a second region different from the first region if the third command that specifies the first region for changing the image capturing region is transmitted to the image capturing apparatus.

24. A non-transitory computer readable storage medium storing a program for controlling an apparatus having a computer to execute the following steps:
receiving, via a network, at least one of a first command that instructs to rotate an image captured by an image pickup unit by 180 degrees, and a second command that instructs to reverse a control direction for changing an image capturing region captured by the image capturing unit; and
executing, if one of the first command and the second command is received, both of a first process corresponding to the first command and a second process corresponding to the second command, in response to the one of the first command and the second command,
wherein, if a third command that specifies a first region for changing the image capturing region is received before the second process is executed, the image pickup unit is controlled to capture an image corresponding to the first region, and
wherein, if the third command that specifies the first region for changing the image capturing region is received after the second process is executed, the image pickup unit is controlled to capture an image corresponding to a second region different from the first region.

25. A non-transitory computer readable storage medium storing a program for controlling an apparatus having a computer to execute the following steps:
transmitting, to an image capturing apparatus via a network, a first command that instructs to rotate an image captured an image pickup unit of the image capturing apparatus by 180 degrees, and a second command that instructs to reverse a control direction for changing an image capturing region captured by the image capturing unit; and
if an instruction, to transmit one of the first command and the second command to the image capturing apparatus, is inputted to an input unit, transmitting both of the first command and the second command to the image capturing apparatus, in response to the instruction to transmit one of the first command and the second command to the image capturing apparatus,
wherein, the second command is a command for changing a state of the image capturing apparatus from a first state to a second state, the first state is a state in which the image pickup unit captures an image corresponding to a first region if a third command that specifies the first region for changing the image capturing region is transmitted to the image capturing apparatus, and the second state is a state in which the image pickup unit captures an image corresponding to a second region different from the first region if the third command that specifies the first region for changing the image capturing region is transmitted to the image capturing apparatus.

* * * * *